United States Patent
Li

(10) Patent No.: US 12,537,452 B2
(45) Date of Patent: Jan. 27, 2026

(54) CONVERSION CIRCUIT, VOLTAGE CONVERSION APPARATUS, AND ELECTRIC VEHICLE

(71) Applicant: Huawei Digital Power Technologies Co., Ltd., Shenzhen (CN)

(72) Inventor: Xiaoqiu Li, Dongguan (CN)

(73) Assignee: HUAWEI DIGITAL POWER TECHNOLOGIES CO., LTD., Shenzhen (CN)

( * ) Notice: Subject to any disclaimer, the term of this patent is extended or adjusted under 35 U.S.C. 154(b) by 268 days.

(21) Appl. No.: 18/361,016

(22) Filed: Jul. 28, 2023

(65) Prior Publication Data

US 2023/0369979 A1 Nov. 16, 2023

Related U.S. Application Data

(63) Continuation of application No. PCT/CN2021/074526, filed on Jan. 29, 2021.

(51) Int. Cl.
*H02M 3/158* (2006.01)
*B60L 53/22* (2019.01)
*H02M 1/08* (2006.01)

(52) U.S. Cl.
CPC .......... *H02M 3/1582* (2013.01); *B60L 53/22* (2019.02); *H02M 1/083* (2013.01); *B60L 2210/10* (2013.01)

(58) Field of Classification Search
CPC ..... H02M 3/1582; H02M 1/083; B60L 53/22; B60L 2210/10
See application file for complete search history.

(56) References Cited

U.S. PATENT DOCUMENTS 10,734,898 B1   8/2020   Arnold et al.
11,728,725 B2 * 8/2023   Chen ..................... H02M 1/143
                                                        363/45

(Continued)

FOREIGN PATENT DOCUMENTS

CN   105119486 A   12/2015
CN   106787736 A    5/2017

(Continued)

OTHER PUBLICATIONS

Ma Sheng-quan et al., "Design of a New Type Bidirectional DC-DC Switched Capacitor Converter," Electric Drive, vol. 45, No. 1, Oct. 2015, with an English abstract, 7 pages.

(Continued)

*Primary Examiner* — Adolf D Berhane
(74) *Attorney, Agent, or Firm* — Conley Rose, P.C.

(57) ABSTRACT

A conversion circuit includes a buck-boost unit and a switched capacitor unit. The buck-boost unit may perform buck conversion or boost conversion on a received first input voltage, use a first input voltage obtained after the buck conversion or boost conversion as a forward voltage, and provide the forward voltage for the switched capacitor unit. The switched capacitor unit may perform boost conversion on the forward voltage, and output a forward voltage obtained after the boost conversion as a first output voltage. The conversion circuit may support continuous adjustment of a transformation ratio, and a maximum transformation ratio of the conversion circuit is not limited by a transformation ratio of the switched capacitor unit. The first output voltage of the conversion circuit may be any voltage not less than the first input voltage.

20 Claims, 22 Drawing Sheets

(56) References Cited

U.S. PATENT DOCUMENTS

| | | |
|---|---|---|
| 2014/0268946 A1 | 9/2014 | Liu |
| 2017/0338735 A1 | 11/2017 | Alarcon-Cot et al. |
| 2018/0026540 A1 | 1/2018 | Chen et al. |
| 2019/0013731 A1 | 1/2019 | Gritti |
| 2020/0083805 A1 | 3/2020 | Mauri |
| 2020/0186028 A1 | 6/2020 | Cheng |
| 2020/0244161 A1 | 7/2020 | Hou et al. |
| 2020/0304021 A1 | 9/2020 | Khlat |
| 2022/0255429 A1* | 8/2022 | Chen .................. H02M 1/007 |
| 2025/0015718 A1* | 1/2025 | Pedroso ............. H02M 1/0095 |

FOREIGN PATENT DOCUMENTS

| | | |
|---|---|---|
| CN | 107112894 A | 8/2017 |
| CN | 107276397 A | 10/2017 |
| CN | 107834844 A | 3/2018 |
| CN | 109274264 A | 1/2019 |
| CN | 109361314 B | 10/2020 |
| CN | 111756244 A | 10/2020 |
| EP | 2797216 A1 | 10/2014 |
| EP | 3105852 B1 | 12/2020 |
| JP | 2007089372 A | 4/2007 |
| KR | 101915244 B1 | 12/2018 |
| WO | 2015123267 A1 | 8/2015 |

OTHER PUBLICATIONS

Alireza Nami et al, "A Hybrid Cascade Converter Topology With Series-Connected Symmetrical and Asymmetrical Diode-Clamped H-Bridge Cells," IEEE Transactions on Power Electronics, vol. 26, No. 1, Jan. 1, 2011, 15 pages.

Christopher Schaef et al, "A Hybrid Switched-Capacitor Battery Management IC With Embedded Diagnostics for Series-Stacked Li-Ion Arrays", IEEE Journal of Solid-State Circuits, vol. 52, No. 12, Dec. 2017, total 13 pages,XP011673283.

Branislav Stevanovic et al, "Highly Efficient, Full ZVS, Hybrid, Multilevel DC/DC Topology for Two-Stage Grid-Connected 1500-V PV System With Employed 900-V SiC Devices", IEEE Journal of Emerging and Selected Topics in Power Electronics, vol. 7,No. 2,Jun. 2019, total 22 pages, XP011721916.

Ze Ni et al, "Development of a 100 kW SiC Switched Tank Converter for Automotive Applications",2019 IEEE Energy Conversion Congress and Exposition(ECCE),Sep. 29, 2019,total 8 pages1XP033666371.

Qin Shibin et al: "A High-Power-Density Power Factor Correction Front End Based on Seven-Level Flying Capacitor Multilevel Converter",vol. 7, No. 3, Sep. 1, 2019, pp. 1883-1898, XP011737111.

Vu Trong Tue et al: "Implementation of mult824level bridgeless PFC rectifiers for mid-power single phase applications",Mar. 20, 2026, pp. 1835-1841, XP032899029.

Qin Shibin et al: "A high power density power factor correction front end based on a 7-level flying capacitor multilevel converter",Dec. 5, 2016, pp. 1-6, XP033059782.

Zhang Yuqing et al: "Multilevel Non-Inverting Buck-Boost Converter with Low-Frequency Ripple-Shaping Based Controller for Operator in Step-down/Step-up Transition Region",Jun. 25, 2018, pp. 1-7, XP033402399.

Du Zhentao Stephen et al: "High Density High Power DC-DC Converter Architectures for Future Electric Transportation Applications",Sep. 29, 2019, pp. 5862-5869, XP033667136.

* cited by examiner

Conversion circuit 112

Conversion circuit 112

CONVERSION CIRCUIT, VOLTAGE CONVERSION APPARATUS, AND ELECTRIC VEHICLE

CROSS-REFERENCE TO RELATED APPLICATIONS

This is a continuation of Int'l Patent App. No. PCT/CN2021/074526, filed on Jan. 29, 2021, which is incorporated by reference.

FIELD

This disclosure relates to the field of new energy vehicle technologies, and in particular, to a conversion circuit, a voltage conversion apparatus, and an electric vehicle.

BACKGROUND

A switched capacitor circuit may also be referred to as a switched-capacitor boost topology, has advantages such as high efficiency and a small size, and is widely applied to many types of electronic devices. A switched capacitor circuit mainly includes a plurality of conversion switching transistors and a plurality of conversion capacitors. The plurality of conversion switching transistors may be used to control the plurality of conversion capacitors to be periodically charged and discharged, thereby implementing boost conversion.

A ratio of an output voltage to an input voltage of the switched capacitor circuit may be referred to as a transformation ratio of the switched capacitor circuit. Usually, most transformation ratios that can be implemented by the switched capacitor circuit are integers. In some existing conversion circuits, both a buck circuit and the switched capacitor circuit may be integrated, so that the conversion circuit can implement a continuous transformation ratio. However, most maximum transformation ratios that can be implemented by such a conversion circuit are limited by the transformation ratio of the switched capacitor circuit.

Therefore, the conversion circuit integrating the switched capacitor circuit currently needs to be further studied.

SUMMARY

This disclosure provides a conversion circuit, a voltage conversion apparatus, and an electric vehicle. The conversion circuit may support continuous adjustment of a transformation ratio. Compared with a switched capacitor circuit, the conversion circuit can implement a higher transformation ratio.

According to a first aspect, a conversion circuit mainly includes a buck-boost unit and a switched capacitor unit. Both a high potential terminal of the buck-boost unit and a high potential terminal of the switched capacitor unit are connected to a high potential output terminal of the conversion circuit, a first intermediate terminal of the buck-boost unit is connected to a second intermediate terminal of the switched capacitor unit, and both a low potential terminal of the buck-boost unit and a low potential terminal of the switched capacitor unit are connected to a low potential output terminal of the conversion circuit. The buck-boost unit may receive a first input voltage, perform buck conversion or boost conversion on the first input voltage, use a first input voltage obtained after the buck-boost conversion as a forward voltage, and provide the forward voltage for the switched capacitor unit through the first intermediate terminal. The switched capacitor unit may perform boost conversion on the forward voltage. The high potential output terminal and the low potential output terminal of the conversion circuit may output a first output voltage, and the first output voltage is a forward voltage obtained after the boost conversion.

Specifically, the buck-boost unit may not only perform buck conversion on the first input voltage, but also perform boost conversion on the first input voltage. When the buck-boost unit performs buck conversion on the first input voltage, the forward voltage may be any voltage not less than 1/N of the first input voltage and not greater than the first input voltage, where N represents a transformation ratio of the switched capacitor unit, and N is an integer greater than or equal to 1. In this case, the switched capacitor unit performs boost conversion on the forward voltage, so that the forward voltage (namely the first output voltage) obtained after the boost conversion may reach any voltage between the first input voltage and N times the first input voltage.

When the buck-boost unit performs boost conversion on the first input voltage, the forward voltage may be any voltage not less than the first input voltage. In this case, the switched capacitor unit performs boost conversion on the forward voltage, so that the forward voltage (namely the first output voltage) obtained after the boost conversion may reach any voltage not less than the N times the first input voltage.

Therefore, the conversion circuit may support continuous adjustment of the transformation ratio, and a maximum transformation ratio of the conversion circuit is no longer limited by a transformation ratio of the switched capacitor unit. The first output voltage of the conversion circuit may be any voltage not less than the first input voltage, to help improve universality of the conversion circuit.

For example, the buck-boost unit includes a first diode, a second diode, a first switching transistor, a second switching transistor, and a first inductor. One terminal of the first inductor is connected to a high potential input terminal of the conversion circuit, and the other terminal of the first inductor is connected to each of an anode of the first diode, a first electrode of the first switching transistor, and a first electrode of the second switching transistor. A cathode of the first diode is connected to the high potential output terminal of the conversion circuit, a second electrode of the first switching transistor is connected to an anode of the second diode, and a cathode of the second diode is connected to the second intermediate terminal of the switched capacitor unit. A second electrode of the second switching transistor is connected to each of a low potential input terminal and the low potential output terminal of the conversion circuit, and the high potential input terminal and the low potential input terminal of the conversion circuit are configured to receive the first input voltage.

As described above, the buck-boost unit may perform buck conversion on the first input voltage. Specifically, the first switching transistor may be kept turned off in a period, and the second switching transistor may be kept turned on in a first time period in the period, to charge the first inductor. The second switching transistor is kept turned off in a second time period in the period, to discharge the first inductor. In this case, the buck-boost unit may perform buck conversion on the first input voltage, and the obtained first output voltage may be any voltage not less than the first input voltage and not greater than N times the first input voltage.

As described above, the buck-boost unit may perform boost conversion on the first input voltage. Specifically, the second switching transistor may be kept turned on in the period. The first switching transistor may be kept turned on in the first time period in the period, to charge the first inductor. The second switching transistor is kept turned off in the second time period in the period, to discharge the first inductor. In this case, the buck-boost unit may perform boost conversion on the first input voltage, and the obtained first output voltage may be any voltage not less than N times the first input voltage.

In a possible implementation, the conversion circuit further supports bidirectional voltage conversion. In other words, the conversion circuit may not only receive the first input voltage through the high potential input terminal and the low potential input terminal, and output the first output voltage through the high potential output terminal and the low potential output terminal, but also receive a second input voltage through the high potential output terminal and the low potential output terminal, and output a second output voltage through the high potential input terminal and the low potential input terminal. In this case, the switched capacitor unit may further perform buck conversion on the second input voltage, use a second input voltage obtained after the buck conversion as a reverse voltage, and provide the reverse voltage for the buck-boost unit through the second intermediate terminal. The buck-boost unit may perform buck conversion or boost conversion on the reverse voltage, use a reverse voltage obtained after the buck conversion or boost conversion as the second output voltage, and output the second output voltage through the high potential input terminal and the low potential input terminal of the conversion circuit.

Specifically, the reverse voltage provided by the switched capacitor unit for the buck-boost unit may be 1/N of the second input voltage. The buck-boost unit may not only perform buck conversion on the reverse voltage, but also perform boost conversion on the reverse voltage. When the buck-boost unit performs buck conversion on the reverse voltage, the second output voltage may be any voltage not greater than the reverse voltage, that is, the second output voltage may be any voltage not greater than 1/N of the second input voltage. When the buck-boost unit performs boost conversion on the reverse voltage, the second output voltage may be any voltage not less than the reverse voltage and not greater than N times the reverse voltage, that is, the second output voltage may be any voltage not less than 1/N of the second input voltage and not greater than the second input voltage.

For example, the buck-boost unit may further include a third switching transistor and a fourth switching transistor, the third switching transistor includes the first diode, and the fourth switching transistor includes the second diode. A first electrode of the third switching transistor is connected to the high potential output terminal of the conversion circuit, and a second electrode of the third switching transistor is connected to the other terminal of the first inductor. A first electrode of the fourth switching transistor is connected to the second electrode of the second switching transistor, and a second electrode of the fourth switching transistor is connected to the second intermediate terminal of the switched capacitor unit.

To prevent the first switching transistor and the second switching transistor from affecting conversion of the reverse voltage by the buck-boost unit, in a possible implementation, the first switching transistor includes a third diode, an anode of the third diode is connected to the first electrode of the fourth switching transistor, and a cathode of the third diode is connected to the other terminal of the first inductor. The second switching transistor includes a fourth diode, an anode of the fourth diode is connected to each of the low potential input terminal and the low potential output terminal of the conversion circuit, and a cathode of the fourth diode is connected to the other terminal of the first inductor. In this case, when the buck-boost unit converts the reverse voltage, the first switching transistor and the second switching transistor may be turned off, and the diodes in the first switching transistor and the second switching transistor may keep a charge circuit and a discharge circuit of the first inductor in the buck-boost unit turned on, so that an impact of the first switching transistor and the second switching transistor on a conversion process of the reverse voltage may be reduced.

As described above, the buck-boost unit may perform buck conversion on the reverse voltage. Specifically, the first switching transistor, the second switching transistor, and the third switching transistor may be kept turned off in the period. The fourth switching transistor may be kept turned on in the first time period in the period, to charge the first inductor. The fourth switching transistor may be kept turned off in the second time period in the period, to discharge the first inductor. In this case, the buck-boost unit may perform buck conversion on the reverse voltage, and the obtained second output voltage may be any voltage not greater than 1/N of the second input voltage.

As described above, the buck-boost unit may perform boost conversion on the reverse voltage. Specifically, the first switching transistor and the second switching transistor may be kept turned off in the period. The fourth switching transistor may be kept turned on in the period. The third switching transistor may be kept turned on in the first time period in the period, to charge the first inductor. The third switching transistor may be kept turned off in the second time period in the period, to discharge the first inductor. In this case, the buck-boost unit may perform boost conversion on the reverse voltage, and the obtained second output voltage may be any voltage not less than 1/N of the second input voltage and not greater than the second input voltage.

According to a second aspect, a voltage conversion apparatus mainly includes a conversion circuit and a control circuit. The conversion circuit may be any conversion circuit provided in the first aspect. For technical effects of corresponding solutions in the second aspect, refer to the technical effects that may be obtained in the corresponding solutions in the first aspect. Repetitions are not be described in detail.

For example, the conversion circuit may include a buck-boost unit and a switched capacitor unit. Both a high potential terminal of the buck-boost unit and a high potential terminal of the switched capacitor unit are connected to a high potential output terminal of the conversion circuit, a first intermediate terminal of the buck-boost unit is connected to a second intermediate terminal of the switched capacitor unit, and both a low potential terminal of the buck-boost unit and a low potential terminal of the switched capacitor unit are connected to a low potential output terminal of the conversion circuit. The control circuit may control the buck-boost unit to perform buck conversion or boost conversion on a received first input voltage, use a first input voltage obtained after the buck conversion or the boost conversion as a forward voltage, and provide the forward voltage for the switched capacitor unit through the first intermediate terminal. The control circuit controls the switched capacitor unit to perform boost conversion on the forward voltage. The conversion circuit may output a first output voltage through the high potential output terminal and the low potential output terminal, and the first output voltage may be a forward voltage obtained after the boost conversion.

For example, the buck-boost unit may include a first diode, a second diode, a first switching transistor, a second switching transistor, and a first inductor One terminal of the first inductor is connected to a high potential input terminal of the conversion circuit, and the other terminal of the first inductor is connected to each of an anode of the first diode, a first electrode of the first switching transistor, and a first electrode of the second switching transistor. A cathode of the first diode is connected to the high potential output terminal of the conversion circuit, a second electrode of the first switching transistor is connected to an anode of the second diode, and a cathode of the second diode is connected to the second intermediate terminal of the switched capacitor unit. A second electrode of the second switching transistor is connected to each of a low potential input terminal and the low potential output terminal of the conversion circuit, and the high potential input terminal and the low potential input terminal of the conversion circuit are configured to receive the first input voltage.

As described above, the control circuit may control the buck-boost unit to perform buck conversion on the first input voltage. Specifically, the control circuit may control the first switching transistor to be kept turned off in a period, control the second switching transistor to be kept turned on in a first time period in the period, to charge the first inductor, and control the second switching transistor to be kept turned off in a second time period in the period, to discharge the first inductor. In this case, the buck-boost unit may perform buck conversion on the first input voltage, and the obtained first output voltage may be any voltage not less than the first input voltage and not greater than N times the first input voltage.

The control circuit may first keep the first switching transistor turned off, and adjust a duty cycle of the second switching transistor. The duty cycle of the second switching transistor is a ratio of the first time period in which the second switching transistor is kept turned on to the period. The control circuit keeps a current duty cycle of the second switching transistor when the first output voltage reaches a first target voltage. In this implementation, the control circuit may determine the duty cycle of the second switching transistor, so that the first output voltage may reach the first target voltage.

As described above, the control circuit may control the buck-boost unit to perform boost conversion on the first input voltage. Specifically, the control circuit may control the second switching transistor to be kept turned on in the period, control the first switching transistor to be kept turned on in a third time period in the period, to charge the first inductor, and control the first switching transistor to be kept turned off in a fourth time period in the period, to discharge first the inductor. In this case, the buck-boost unit may perform boost conversion on the first input voltage, and the obtained first output voltage may be any voltage not less than N times the first input voltage.

The control circuit may first keep the second switching transistor turned on, and adjust a duty cycle of the first switching transistor. The duty cycle of the first switching transistor is a ratio of the third time period in which the first switching transistor is kept turned on to the period. The control circuit keeps a current duty cycle of the first switching transistor when the first output voltage reaches the first target voltage. In this implementation, the control circuit may determine the duty cycle of the first switching transistor, so that the first output voltage may reach the first target voltage.

In a possible implementation, the voltage conversion apparatus further supports bidirectional voltage conversion. In other words, the high potential output terminal and the low potential output terminal of the conversion circuit may further receive the second input voltage, and the high potential input terminal and the low potential input terminal of the conversion circuit may further output the second output voltage. The control circuit may further control the switched capacitor unit to perform buck conversion on the second input voltage, use a second input voltage obtained after the buck conversion as a reverse voltage, and provide the reverse voltage for the buck-boost unit through the second intermediate terminal. The control circuit controls the buck-boost unit to perform buck conversion or boost conversion on the reverse voltage, use a reverse voltage obtained after the buck conversion or boost conversion as the second output voltage, and output the second output voltage through the high potential input terminal and the low potential input terminal of the conversion circuit.

For example, the buck-boost unit may further include a third switching transistor and a fourth switching transistor, the third switching transistor includes the first diode, and the fourth switching transistor includes the second diode. A first electrode of the third switching transistor is connected to the high potential output terminal of the conversion circuit, and a second electrode of the third switching transistor is connected to the other terminal of the first inductor. A first electrode of the fourth switching transistor is connected to the second electrode of the second switching transistor, and a second electrode of the fourth switching transistor is connected to the second intermediate terminal of the switched capacitor unit.

To prevent the first switching transistor and the second switching transistor from affecting conversion of the reverse voltage by the buck-boost unit, in a possible implementation, the first switching transistor includes a third diode, an anode of the third diode is connected to the first electrode of the fourth switching transistor, and a cathode of the third diode is connected to the other terminal of the first inductor. The second switching transistor includes a fourth diode, an anode of the fourth diode is connected to each of the low potential input terminal and the low potential output terminal of the conversion circuit, and a cathode of the fourth diode is connected to the other terminal of the first inductor.

As described above, the control circuit may control the buck-boost unit to perform buck conversion on the reverse voltage. Specifically, the control circuit may control the first switching transistor, the second switching transistor, and the third switching transistor to be kept turned off in the period, control the fourth switching transistor to be kept turned on in a fifth time period in the period, to charge the first inductor, and control the fourth switching transistor to be kept turned off in a sixth time period in the period, to discharge the first inductor. In this case, the buck-boost unit may perform buck conversion on the reverse voltage, and the obtained second output voltage may be any voltage not greater than 1/N of the second input voltage.

The control circuit may first keep the first switching transistor, the second switching transistor, and the third switching transistor turned off in the period, and adjust a duty cycle of the fourth switching transistor. The duty cycle of the fourth switching transistor is a ratio of the fifth time period in which the fourth switching transistor is kept turned on to the period. The control circuit keeps a current duty cycle of the fourth switching transistor when the second output voltage reaches a second target voltage. In this implementation, the control circuit may determine the duty cycle of the fourth switching transistor, so that the second output voltage may reach the second target voltage.

As described above, the control circuit may control the buck-boost unit to perform boost conversion on the reverse voltage. Specifically, the control circuit may control the first switching transistor and the second switching transistor to be kept turned off in the period, control the fourth switching transistor to be kept turned on in the period, control the third switching transistor to be kept turned on in a seventh time period in the period, to charge the first inductor, and control the third switching transistor to be kept turned off in an eighth time period in the period, to discharge the first inductor. In this case, the buck-boost unit may perform boost conversion on the reverse voltage, and the obtained second output voltage may be any voltage not less than 1/N of the second input voltage and not greater than the second input voltage.

The control circuit may first keep the first switching transistor and the second switching transistor turned off, keep the fourth switching transistor turned on, and adjust a duty cycle of the third switching transistor. The duty cycle of the third switching transistor is a ratio of the seventh time period in which the third switching transistor is kept turned on to the period. The control circuit keeps a current duty cycle of the third switching transistor when the second output voltage reaches the second target voltage. In this implementation, the control circuit may determine the duty cycle of the third switching transistor, so that the second output voltage may reach the second target voltage.

According to a third aspect, an electric vehicle mainly includes a power battery and any voltage conversion apparatus provided in the second aspect. The voltage conversion apparatus may charge the power battery.

These aspects or other aspects are clearer and more comprehensible in the following description of the embodiments.

DETAILED DESCRIPTION

Figure 1:
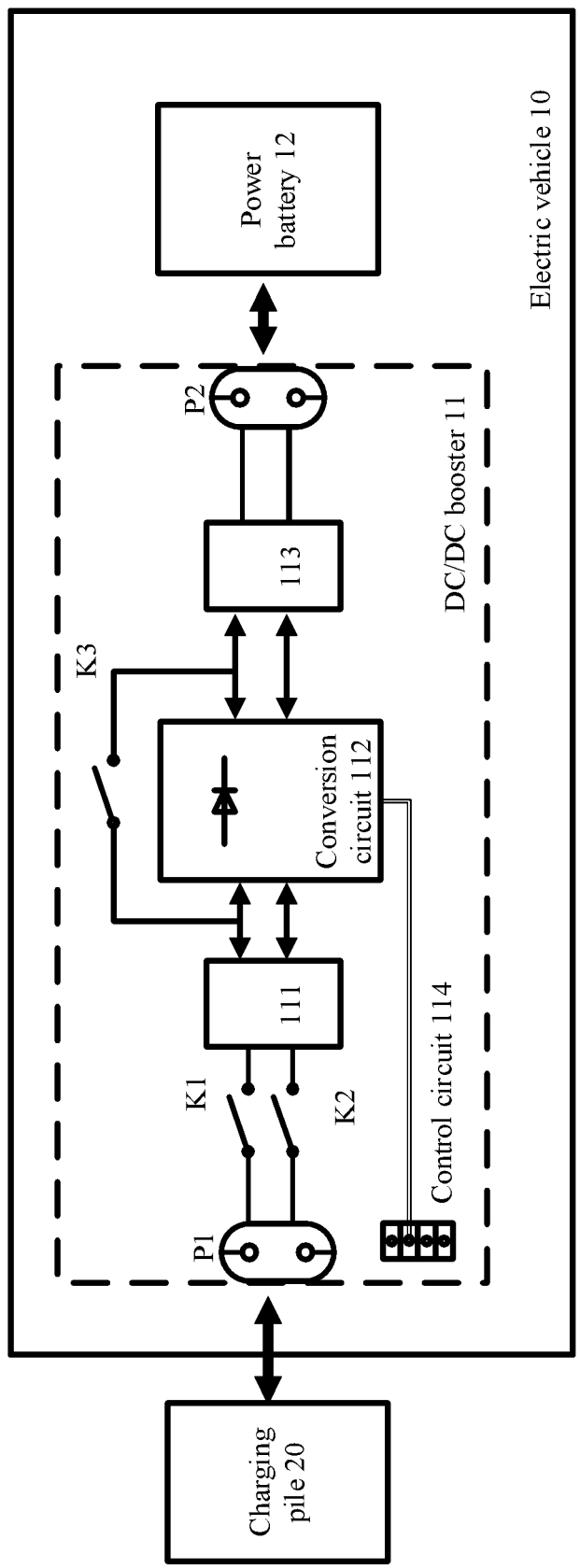
FIG. 1 is a schematic diagram of an electric vehicle charging system.

To make objectives, technical solutions, and advantages of this disclosure clearer, the following further describes this disclosure in detail with reference to the accompanying drawings. A specific operation method in a method embodiment may also be applied to an apparatus embodiment or a system embodiment. "At least one" means one or more, and "a plurality of" means two or more. In view of this, "a plurality of" may also be understood as "at least two". The term "and/or" describes an association relationship for describing associated objects and represents that three relationships may exist. For example, A and/or B may represent the following three cases: Only A exists, both A and B exist, and only B exists. In addition, the character "/", unless otherwise specified, generally indicates an "or" relationship between the associated objects. In addition, words such as "first" and "second" are merely used for distinguished descriptions, and cannot be understood as an indication or implication of relative importance, and cannot be understood as an indication or implication of a sequence.

A "connection" may be understood as an electrical connection, and a connection between two electrical elements may be a direct connection or an indirect connection between the two electrical elements. For example, a connection between A and B may represent that A and B are directly connected to each other, or A and B are indirectly connected to each other by using one or more other electrical elements. For example, the connection between A and B may also represent that A is directly connected to C, C is directly connected to B, and A and B are connected to each other through C.

It should be noted that, a diode may be integrated into a switching transistor in embodiments. The switching transistor may be one or more of a plurality of types of switching transistors such as a relay, a metal-oxide-semiconductor field-effect transistor (MOSFET), a bipolar junction transistor (BJT), an insulated-gate bipolar transistor (IGBT), and a silicon carbide (SiC) transistor. The switching transistors are not listed one by one in embodiments. An encapsulation form of each switching transistor may be a single-transistor encapsulation, or may be a multi-transistor encapsulation. Each switching transistor may include a first electrode, a second electrode, and a control electrode, and the control electrode is configured to control the switching transistor to be turned on or turned off. When the switching transistor is turned on, a current may be transmitted between the first electrode and the second electrode of the switching transistor. When the switching transistor is turned off, a current cannot be transmitted between the first electrode and the second electrode of the switching transistor. The IGBT is used as an example. A control electrode of the switching transistor is a gate electrode, a first electrode of the switching transistor may be a collector of the switching transistor, and a second electrode may be an emitter of the switching transistor; or the first electrode may be an emitter of the switching transistor, and the second electrode may be a collector of the switching transistor. The following describes in detail embodiments with reference to accompanying drawings.

A switched capacitor circuit may also be referred to as a switched-capacitor boost topology, has advantages such as high efficiency and a small size, and is widely applied to many types of electronic devices. For example, the switched capacitor circuit is usually disposed in a car charger of an electric vehicle, and a direct current (DC)/DC conversion may be implemented by using the switched capacitor circuit.

An electric vehicle is used as an example. FIG. 1 is a schematic diagram of an example of an electric vehicle charging system. As shown in FIG. 1, a charging pile 20 may provide a charging voltage for an electric vehicle 10. In some scenarios, the charging voltage may be a direct current voltage (most charging voltages are not more than 500 volts (V)). The electric vehicle 10 may charge a power battery 12 based on the charging voltage provided by the charging pile 20.

Currently, a high-voltage power battery pack is used for more electric vehicles 10. In other words, a value of a charging voltage required by the power battery 12 is high (most values are not less than 800 V), and a charging voltage provided by some charging piles 20 cannot directly charge the power battery 12.

In view of this, the electric vehicle 10 may further include a DC/DC booster 11. The DC/DC booster 11 may perform boost conversion on a charging voltage, so that a charging voltage obtained after voltage conversion may be adapted to the power battery 12, to charge the power battery 12.

Specifically, the DC/DC booster 11 includes an interface P1 and an interface P2. The DC/DC booster 11 may be connected to the charging pile 20 through the interface P1, and connected to the power battery 12 through the interface P2. The DC/DC booster 11 may further include fast charging contactors K1 and K2, a bypass contactor K3, electromagnetic compatibility (EMC) filter circuits 111 and 113, and a conversion circuit 112.

One terminal of the fast charging contactor K1 is connected to a high potential input terminal of the interface P1, and the other terminal of the fast charging contactor K1 is connected to a high potential input terminal of the EMC filter circuit 111. One terminal of the fast charging contactor K2 is connected to a low potential input terminal of the interface P1, and the other terminal of the fast charging contactor K2 is connected to a low potential input terminal of the EMC filter circuit 111.

When the electric vehicle 10 is being charged, the fast charging contactors K1 and K2 are turned on, so that a path is formed between a charger 20 and the DC/DC booster 11. When the electric vehicle 10 stops being charged, the fast charging contactors K1 and K2 are turned off, to prevent the interface P1 from being electrified, and help protect user safety.

A high potential output terminal of the EMC filter circuit 111 is connected to a high potential input terminal of the conversion circuit 112, and a low potential output terminal of the EMC filter circuit 111 is connected to a low potential input terminal of the conversion circuit 112. The EMC filter circuit 111 may filter a received charging voltage, and provide the filtered charging voltage to the conversion circuit 112.

The conversion circuit 112 may be a DC/DC conversion circuit and may perform boost conversion on the charging voltage. For example, if a charging voltage provided by the charging pile 20 is 500 V, and a charging voltage adapted to the power battery 12 is 800 V, the conversion circuit 112 may boost and convert the charging voltage of 500 V to 800 V.

A high potential output terminal of the conversion circuit 112 is connected to a high potential input terminal of the EMC filter circuit 113, and a low potential output terminal of the conversion circuit 112 is connected to a low potential input terminal of the EMC filter circuit 113. The conversion circuit 112 may output a charging voltage obtained after the boost conversion to the EMC filter circuit 113, so that the EMC filter circuit 113 may further filter the charging voltage obtained after the boost conversion.

In the electric vehicle 10, a high potential output terminal of the EMC filter circuit 113 is connected to a high potential terminal of the interface P2, and the high potential terminal of the interface P2 may be connected to a positive electrode of the power battery 12. A low potential output terminal of the EMC filter circuit 113 is connected to a low potential terminal of the interface P2, and the low potential terminal of the interface P2 may be connected to a negative electrode of the power battery 12. Therefore, the EMC filter circuit 113 may provide, through the interface P2, the charging voltage obtained after filtering and boost conversion to the power battery 12, to charge the power battery 12.

As shown in FIG. 1, the DC/DC booster 11 may further include a bypass contactor K3. One terminal of the bypass contactor K3 is connected to the high potential input terminal of the conversion circuit 112, and the other terminal of the bypass contactor K3 is connected to the low potential input terminal of the conversion circuit 112. When the charging voltage provided by the charging pile 20 can be adapted to the power battery 12, the bypass contactor K3 may be kept turned on. In this case, after being filtered by the EMC filter circuit 111 and the EMC filter circuit 113, the charging voltage provided by the charging pile 20 may be transmitted to the power battery 12, to directly charge the power battery 12. When the charging voltage provided by the charging pile 20 cannot be adapted to the power battery 12, the bypass contactor K3 may be turned off. In this case, the conversion circuit 112 needs to perform voltage conversion on the charging voltage provided by the charging pile 20, so that the charging voltage is adapted to the power battery 12.

It can be learned from FIG. 1, the DC/DC booster 11 may further include a control circuit 114. The control circuit 114 is connected to the conversion circuit 112, and may control the conversion circuit 112 to perform voltage conversion. For example, a receiving control module 102 may be a control component such as a processor, a microprocessor, or a controller in the electric vehicle 10, for example, may be a general-purpose central processing unit (CPU), a general purpose processor, a digital signal processor (DSP), an application-specific integrated circuit (ASIC), a field-programmable gate array (FPGA) or another programmable logic device, a transistor logic device, a hardware component, or any combination thereof.

It can be learned from the foregoing content that, the conversion circuit 112 is a basis for implementing a boost conversion function of the DC/DC booster 11. The following further describes the conversion circuit 112.

Figure 2:
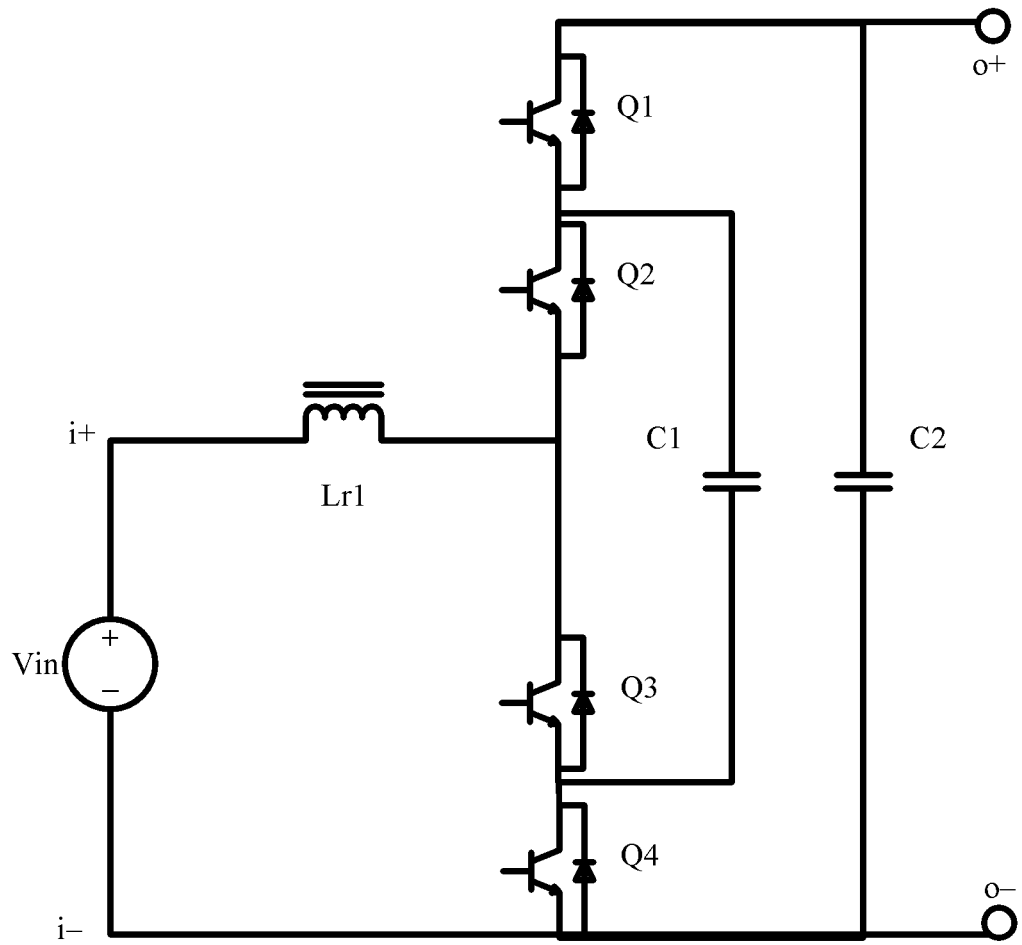
FIG. 2 is a schematic diagram of a structure of a conversion circuit.

FIG. 2 is a schematic diagram of an example structure of a conversion circuit. A conversion circuit 112 shown in FIG. 2 mainly includes an inductor Lr1, switching transistors Q1 to Q4, a capacitor C1, and a capacitor C2. A first electrode of the switching transistor Q1 is configured to be connected to a high potential output terminal o+ of the conversion circuit 112, and a second electrode of the switching transistor Q1 is connected to a first electrode of a switching transistor Q2. A second electrode of a switching transistor Q2 is connected to a first electrode of a switching transistor Q3, and a second electrode of the switching transistor Q3 is connected to a first electrode of a switching transistor Q4. A second electrode of the switching transistor Q4 is connected to each of a low potential input terminal i− and a low potential output terminal o− of the conversion circuit 112.

One terminal of the capacitor C1 is connected to the first electrode of the switching transistor Q2, and the other terminal of the capacitor C1 is connected to the second electrode of the switching transistor Q3. One terminal of the capacitor C2 is connected to the high potential output terminal o+ of the conversion circuit 112, and the other terminal of the capacitor C2 is connected to the low potential output terminal o− of the conversion circuit 112.

For example, each capacitor in this embodiment may be of a capacitor type such as a thin film capacitor, an electrolytic capacitor, or a ceramic capacitor.

One terminal of the inductor Lr1 is connected to a high potential input terminal i+ of the conversion circuit 112, and the other terminal of the inductor Lr1 is connected to the second electrode of the switching transistor Q2. A voltage between one terminal of the inductor Lr1 and the second electrode of the switching transistor Q4 may be understood as an input voltage Vin of the conversion circuit 112.

In this embodiment, control electrodes of the switching transistors Q1 to Q4 may be connected to the control circuit 114, so that the control circuit 114 may separately control turn-on and turn-off of the switching transistors Q1 to Q4. It should be understood that, to simplify illustration, the connection relationship is not shown in an accompanying drawing in this embodiment.

Figure 3:
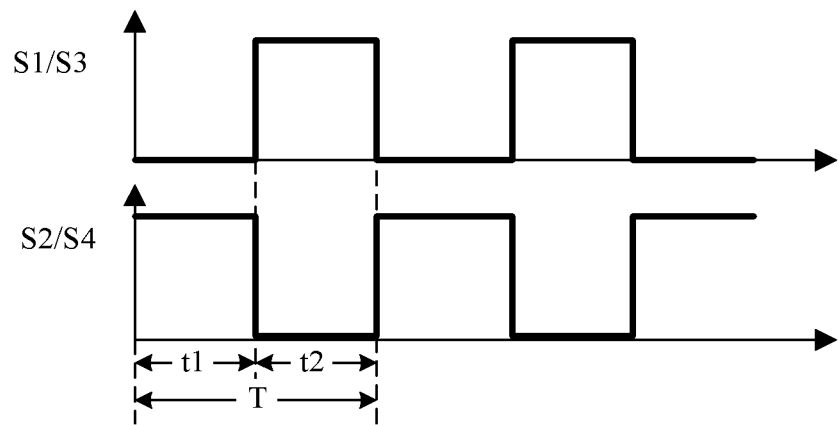
FIG. 3 is a schematic diagram of a control signal.

Based on the conversion circuit 112 shown in FIG. 2, the control circuit 114 may respectively provide control signals S1 to S4 shown in FIG. 3 for the switching transistors Q1 to Q4. Specifically, the control circuit 114 may provide the control signal S1 for the switching transistor Q1, a control signal S2 for the switching transistor Q2, a control signal S3 for the switching transistor Q3, and the control signal S4 for the switching transistor Q4.

If the switching transistors Q1 to Q4 are all turned on at a high electrical level and turned off at a low electrical level, the control signals S1 to S4 may be shown in FIG. 3. It can be learned from FIG. 3 that the control signals S1 to S4 are periodic signals, and a period is T. The period T includes a time period t1 and a time period t2. The following separately describes equivalent circuits of the conversion circuit 112 in the time period t1 and the time period t2.

Time Period t1:

In the time period t1, the control signals S1 and S3 are at a high electrical level, and the control signals S2 and S4 are at a low electrical level, so that the switching transistors Q1 and Q3 are turned on, and the switching transistors Q2 and Q4 are turned off. In this case, an equivalent circuit of the conversion circuit 112 may be shown in FIG. 4A.

Figure 4A:
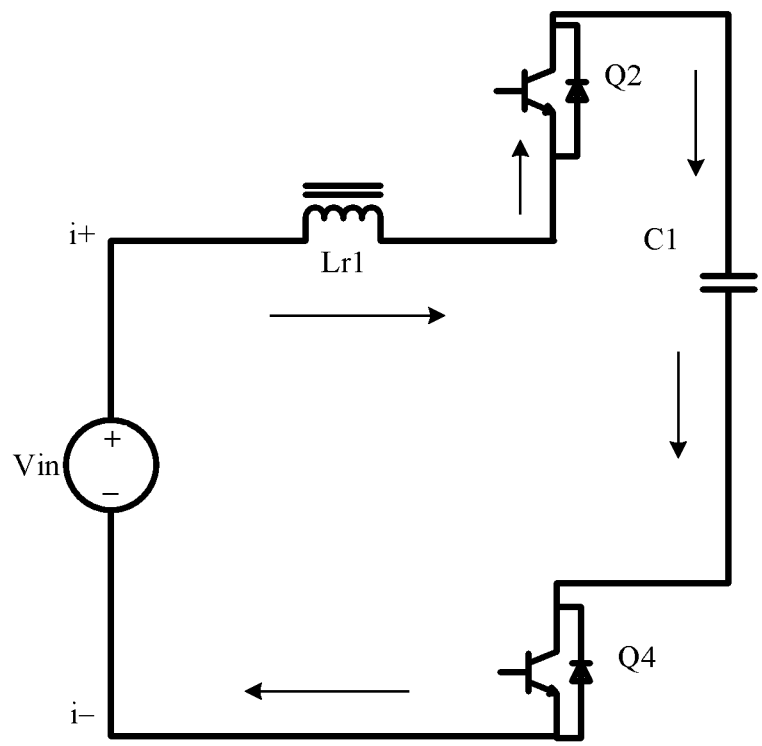
FIG. 4A and FIG. 4B are schematic diagrams of structures of equivalent circuits of a conversion circuit.

It can be learned from FIG. 4A that, a current is input through the high potential input terminal i+ of the conversion circuit 112, successively transmitted through the inductor Lr1, the switching transistor Q2, the capacitor C1, and the switching transistor Q4, and then output through the low potential input terminal i− of the conversion circuit 112. The input voltage Vin charges the capacitor C1, so that a voltage of the capacitor C1 gradually reaches the input voltage Vin.

Time Period t2:

In the time period t1, the control signals S1 and S3 are at a low electrical level, and the control signals S2 and S4 are at a high electrical level, so that the switching transistors Q1 and Q3 are turned off, and the switching transistors Q2 and Q4 are turned on. In this case, an equivalent circuit of the conversion circuit 112 may be shown in FIG. 4B.

Figure 4B:
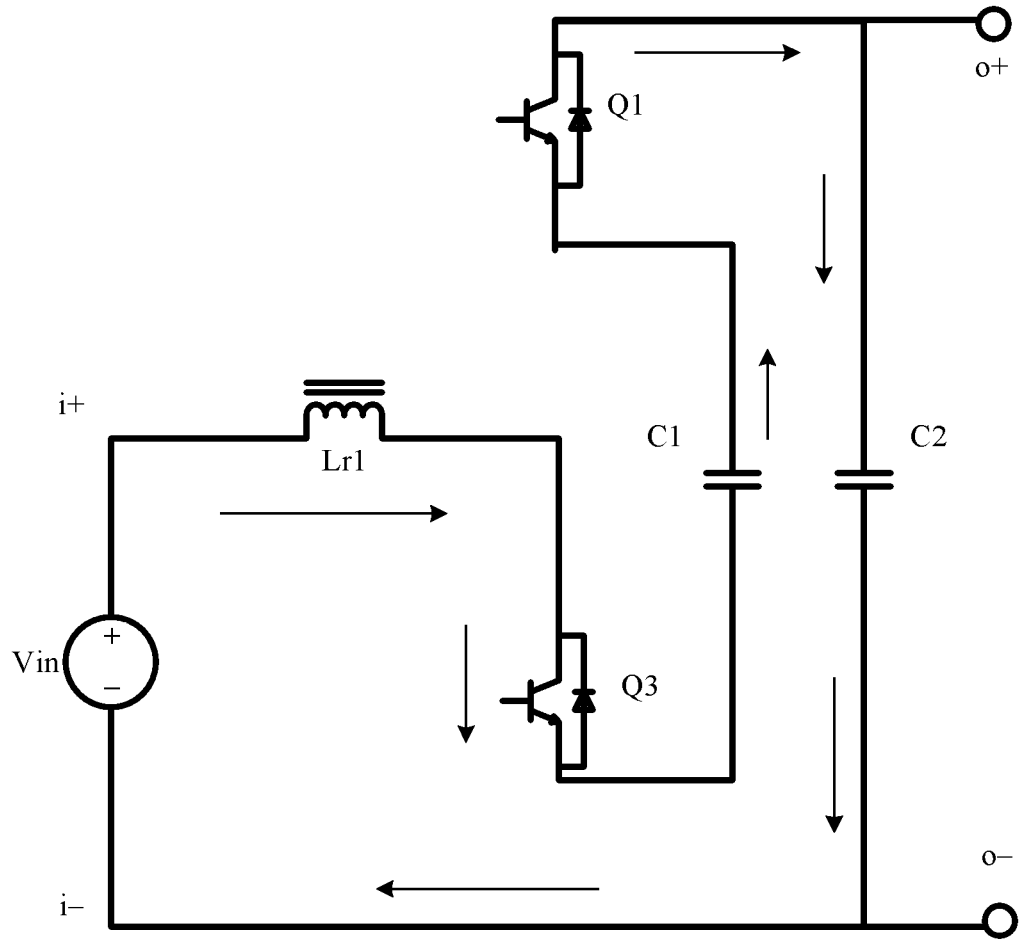

It can be learned from FIG. 4B that, a current is input through the high potential input terminal i+ of the conversion circuit 112, successively transmitted through the inductor Lr1, the switching transistor Q3, the capacitor C1, the switching transistor Q1, and the capacitor C2, and then output through the low potential input terminal i− of the conversion circuit 112. The input voltage Vin and the capacitor C1 are connected in series, to charge the capacitor C2. An output voltage Vout of the conversion circuit 112, that is, a voltage of the capacitor C2, is a sum of the input voltage Vin and a voltage of the capacitor C1. Because the voltage of the capacitor C1 reaches the input voltage Vin in the time period t1, the output voltage Vout of the conversion circuit 112 may reach 2Vin in the time period t2.

It should be noted that the inductor Lr1 may resonate with the capacitor C1. When a switching frequency Fsw of the switching transistors Q1 to Q4 satisfies Formula 1, the inductor Lr1 may implement zero current switching (ZCS) when the switching transistor Q2 and the switching transistor Q4 are turned on.

$$Fsw = \frac{1}{2\pi\sqrt{Lr1 \cdot C1}}$$ (Formula 1)

In Formula 1, Lr1 represents inductance of the inductor Lr1, and C1 represents capacitance of the capacitor C1. When the switching transistor Q2 and the switching transistor Q4 implement zero current switching, a turn-on loss of the switching transistor Q2 and the switching transistor Q4 may be effectively reduced, to help improve efficiency of the conversion circuit 112.

It may be understood that a transformation ratio of the conversion circuit 112 shown in FIG. 2 is 2, that is, Vout=2Vin. Based on the conversion circuit 112 shown in FIG. 2, a higher transformation ratio may be implemented by increasing a quantity of switching transistors and a quantity of capacitors. For example, in FIG. 5, a pair of switching transistors (Q5 and Q6) and a capacitor C3 are added, so that the transformation ratio of the conversion circuit 112 may be increased to 3, that is, Vout=3Vin.

In conclusion, the conversion circuit 112 shown in FIG. 2 controls charging and discharging of a capacitor by using a switching transistor, thereby implementing voltage conversion. Therefore, the conversion circuit 112 shown in FIG. 2 may also be referred to as a switched capacitor circuit. It should be noted that, the inductor Lr1 is mainly configured to enable the switching transistors Q2 and Q4 to implement ZCS. The inductance of the inductor Lr1 is small, and an impact on voltage conversion may be ignored.

Figure 5:
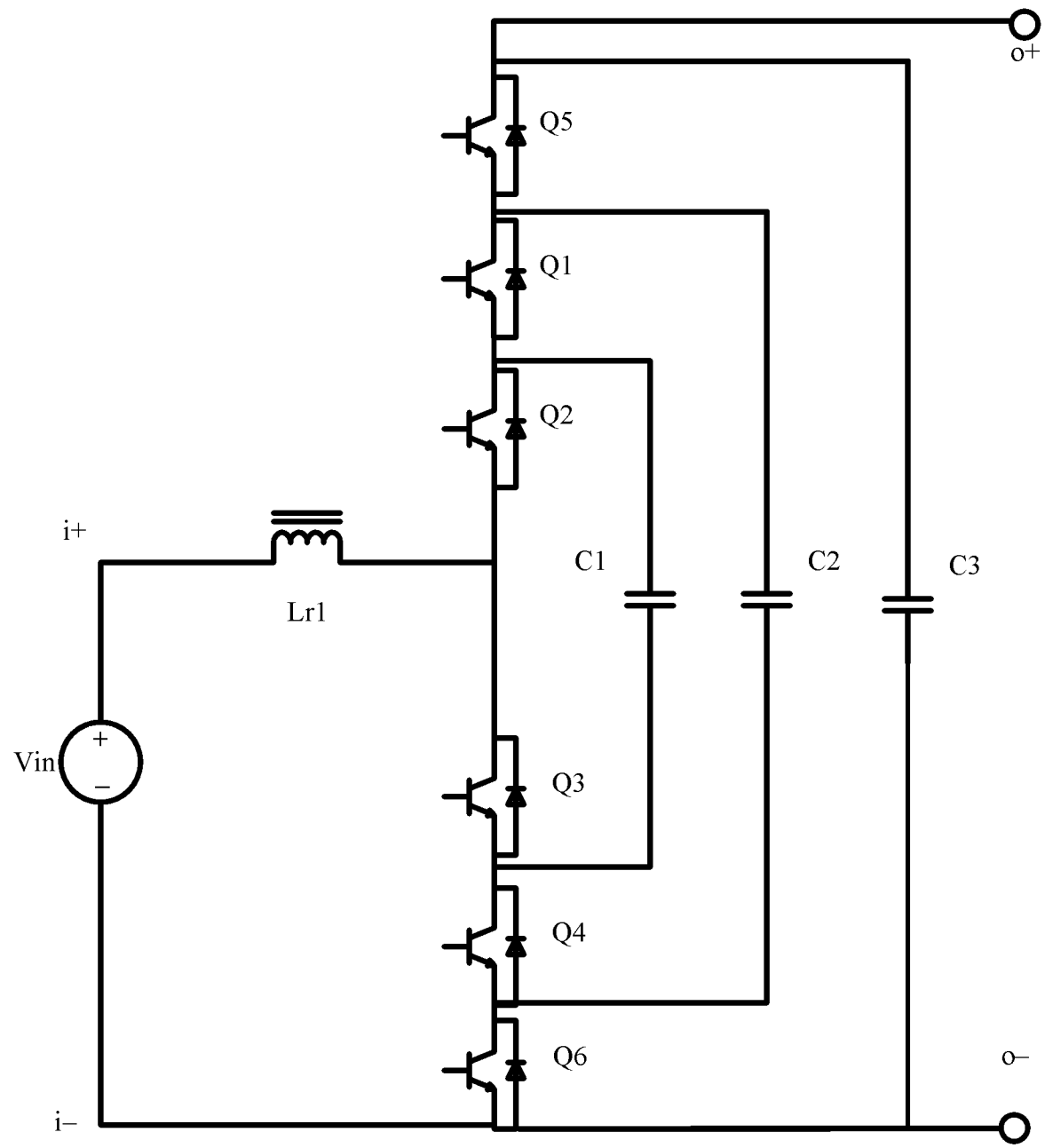
FIG. 5 is a schematic diagram of a structure of a conversion circuit.

Currently, most transformation ratios of the switched capacitor circuit each are an integer, and an output voltage of the switched capacitor circuit cannot be continuously adjusted. For example, transformation ratio of the conversion circuit 112 shown in FIG. 2 is 2, and an output voltage is Vout=2Vin. For another example, a transformation ratio of the conversion circuit 112 shown in FIG. 5 is 3, and an output voltage is Vout=3Vin, which limits an application of the switched capacitor circuit in the conversion circuit 112. In addition, in the time period t2, because the inductor Lr1 simultaneously resonates with the capacitor C1 and the capacitor C2, to implement ZCS of the switching transistor Q1 and the switching transistor Q3, the switching frequency Fsw of the switching transistors Q1 to Q4 needs to satisfy Formula 2:

$$Fsw = \frac{1}{2\pi\sqrt{Lr1 \cdot \frac{C1 \cdot C2}{C1 + C2}}} \quad \text{(Formula 2)}$$

C2 in Formula 2 represents capacitance of the capacitor C2.

It can be learned, through a comparison between Formula 1 and Formula 2, that Fsw calculated based on Formula 2 is greater than Fsw calculated based on Formula 1. In other words, when the switching transistor Q2 and the switching transistor Q4 implement ZCS, the switching transistor Q1 and the switching transistor Q3 cannot implement ZCS. Correspondingly, when the switching transistor Q1 and the switching transistor Q3 implement ZCS, the switching transistor Q2 and the switching transistor Q4 cannot implement ZCS. Therefore, efficiency of the conversion circuit shown in FIG. 2 needs to be further improved.

Figure 6:
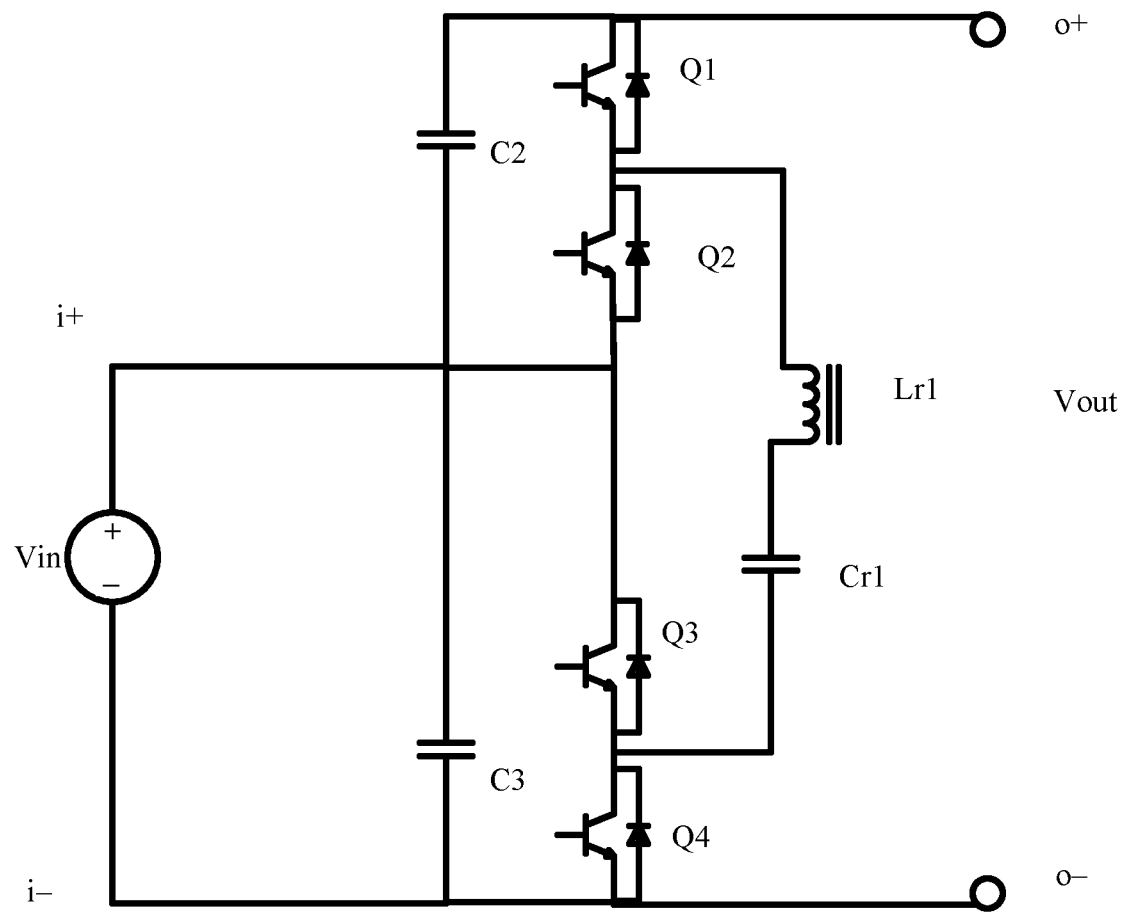
FIG. 6 is a schematic diagram of a structure of a conversion circuit.

In view of this, the conversion circuit 112 may alternatively be shown in FIG. 6. The conversion circuit 112 includes switching transistors Q1 to Q4, a capacitor C2, a capacitor C3, an inductor Lr1, and a capacitor Cr1. A connection relationship between the switching transistors Q1 to Q4 is similar to that in FIG. 2, and details are not described again.

One terminal of the capacitor C2 is connected to a high potential output terminal o+ of the conversion circuit 112, and the other terminal of the capacitor C2 is connected to one terminal of the capacitor C3. One terminal of the capacitor C3 is connected to each of a first electrode of the switching transistor Q3 and a high potential input terminal i+ of the conversion circuit 112, and the other terminal of the capacitor C3 is connected to each of a second electrode of the switching transistor Q4 and a low potential input terminal i− of the conversion circuit 112. One terminal of the inductor Lr1 is connected to the first electrode of the switching transistor Q2, the other terminal of the inductor Lr1 is connected to one terminal of the capacitor Cr1, and the other terminal of the capacitor Cr1 is connected to a second electrode of the switching transistor Q3.

In the conversion circuit 112 shown in FIG. 6, the switching transistors Q1 to Q4 is still applied to the control signals shown in FIG. 3. Based on the conversion circuit 112 shown in FIG. 6, the following separately describes equivalent circuits of the conversion circuit 112 in the time period t1 and the time period t2.

Figure 7A:
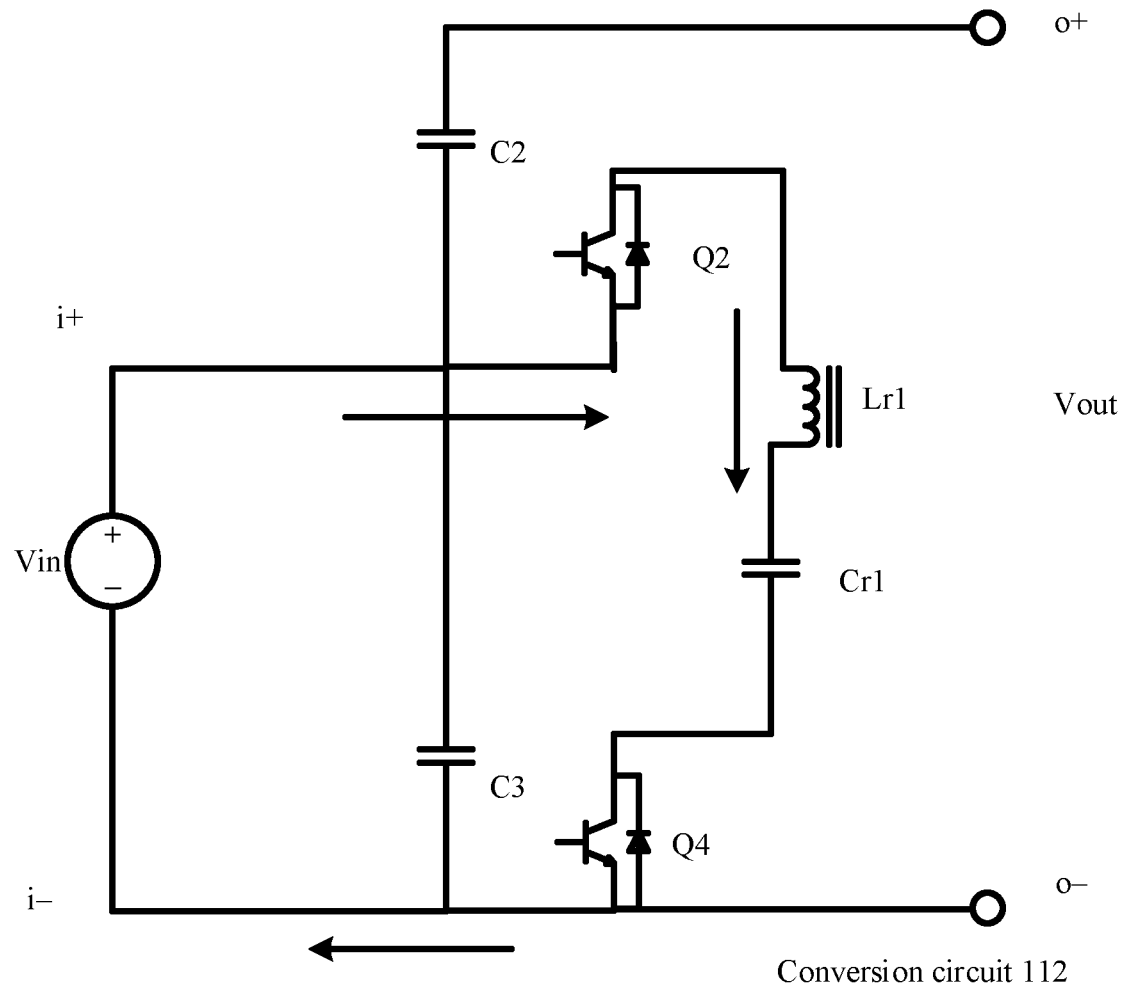
FIG. 7A and FIG. 7B are schematic diagrams of structures of equivalent circuits of a conversion circuit.

Time Period t1:

In the time period t1, the control signals S1 and S3 are at a high electrical level, and the control signals S2 and S4 are at a low electrical level, so that the switching transistors Q1 and Q3 are turned on, and the switching transistors Q2 and Q4 are turned off. In this case, an equivalent circuit of the conversion circuit 112 may be shown in FIG. 7A.

A current is input through the high potential input terminal i+ of the conversion circuit 112, transmitted through the switching transistor Q2, the inductor Lr1, the capacitor Cr1, and the switching transistor Q4, and then output through the low potential input terminal i− of the conversion circuit 112. In this process, the capacitor Cr1 and the inductor Lr1 are charged. It may be considered that a sum of a voltage of the capacitor Cr1 and a voltage of the inductor Lr1 may reach the input voltage Vin.

It can be learned that the inductor Lr1 resonates with the capacitor Cr1 in the time period t1. In other words, when the switching frequency Fsw of the switching transistors Q1 to Q4 satisfies Formula 3, the switching transistor Q2 and the switching transistor Q4 may implement ZCS:

$$Fsw = \frac{1}{2\pi\sqrt{Lr1 \cdot Cr1}} \quad \text{(Formula 3)}$$

In Formula 3, Cr1 represents capacitance of the capacitor Cr1.

Time Segment 2:

In the time period t2, the control signals S1 and S3 are at a high electrical level, and the control signals S2 and S4 are at a low electrical level, so that the switching transistors Q1 and Q3 are turned on, and the switching transistors Q2 and Q4 are turned off. In this case, an equivalent circuit of the conversion circuit 112 may be shown in FIG. 7B.

A current is output through one terminal, close to the inductor Lr1, of the capacitor Cr1, is transmitted through the inductor Lr1, the switching transistor Q1, the capacitor C2, and the switching transistor Q3, and flows back to a terminal, close to the switching transistor Q3, of the capacitor Cr1. In this process, the capacitor Cr1 and the inductor Lr1 are discharged, to charge the capacitor C2. Because the sum of the voltage of the capacitor Cr1 and the voltage of the inductor Lr1 may reach the input voltage Vin in the time period t1, a voltage of the capacitor C2 may reach the input voltage Vin in the time period t2.

Figure 7B:
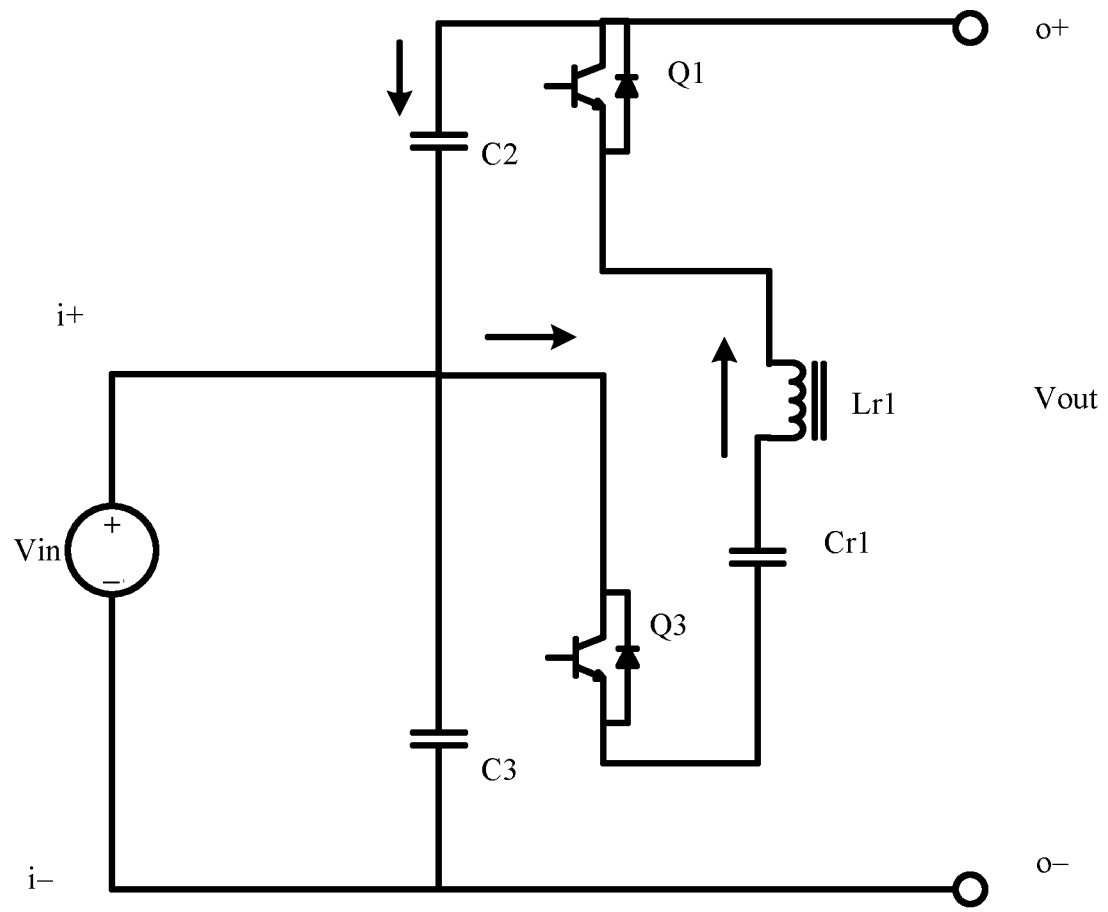

It can be learned from FIG. 7B that, the capacitor C2 and a capacitor C3 are connected in series between a high potential output terminal o+ and a low potential output terminal o− of the conversion circuit 112, so that an output voltage Vout is equal to a sum of the voltage of the capacitor C2 and a voltage of the capacitor C3. The voltage between two terminals of the capacitor C3 is the input voltage Vin. When the voltage of the capacitor C2 is also the input voltage Vin, the output voltage Vout of the conversion circuit 112 shown in FIG. 6 may reach 2Vin. In other words, a transformation ratio of the conversion circuit shown in FIG. 6 is 2.

It can be learned that the inductor Lr1, the capacitor Cr1, and the capacitor C2 resonate in the time period t1. In other words, when the switching frequency Fsw of the switching transistors Q1 to Q4 satisfies Formula 4, the switching transistor Q1 and the switching transistor Q3 may implement ZCS:

$$Fsw = \frac{1}{2\pi\sqrt{Lr1 \cdot \frac{Cr1 \cdot C2}{Cr1 + C2}}} \qquad \text{(Formula 4)}$$

Usually, capacitance of the capacitor C2 is far greater than capacitance of the capacitor Cr1. For example, the capacitance of the capacitor C2 may be 100 times of the capacitance of the capacitor Cr1. In this case, Fsw may be approximately equal to $$\frac{1}{2\pi\sqrt{Lr1 \cdot 0.99 Cr1}}$$

based on Formula 4, and approximate to Fsw shown in Formula 3. Therefore, when the switching frequency Fsw shown in Formula 3 is used, the switching transistors Q1 to Q4 in the switching capacitor shown in FIG. 6 each may implement ZCS, to help further improve efficiency of the conversion circuit 112.

Figure 8:
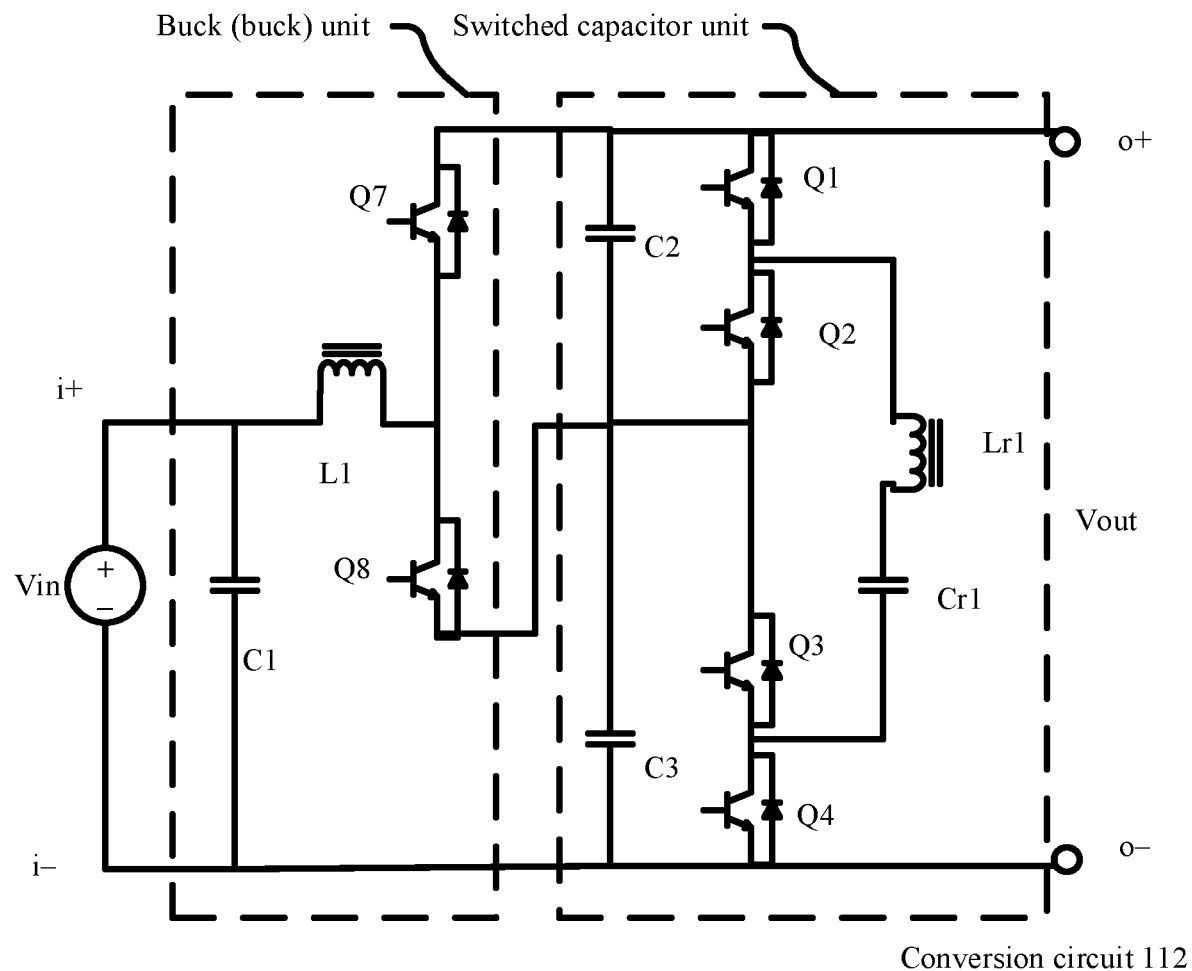
FIG. 8 is a schematic diagram of a structure of a conversion circuit.

Although the conversion circuit 112 shown in FIG. 2 and FIG. 6 has high efficiency, the conversion circuit 112 is still a switched capacitor circuit in essence, only an integral transformation ratio can be realized, and the transformation ratio of the conversion circuit 112 cannot be continuously adjusted. In view of this, a buck circuit may also be integrated in the conversion circuit 112, as shown in FIG. 8. The conversion circuit 112 shown in FIG. 8 mainly includes a buck unit and a switched capacitor unit. A buck circuit topology structure is used for the buck unit, and a switched capacitor circuit topology structure is used for the switched capacitor unit.

For a specific implementation of the switched capacitor unit, refer to FIG. 6. Details are not described again. For ease of understanding, the following describes a scenario in which the transformation ratio of the switched capacitor unit is 2.

For ease of description, a forward voltage is used to represent an output voltage of the buck unit. The buck unit may perform buck conversion on an input voltage Vin, to obtain the forward voltage. Specifically, as shown in FIG. 8, the buck unit includes a capacitor C1, an inductor L1, a switching transistor Q7, and a switching transistor Q8. One terminal of the inductor L1 is connected to a high potential input terminal i+ of the conversion circuit 112, and the other terminal of the inductor L1 is connected to each of a second electrode of the switching transistor Q7 and a first electrode of the switching transistor Q8. A first electrode of the switching transistor Q7 is connected to a high potential output terminal o+ of the conversion circuit 112. A second electrode of the switching transistor Q8 is connected to one terminal of a capacitor C3 in the switched capacitor unit. One terminal of the capacitor C1 is connected to the high potential input terminal i+ of the conversion circuit 112, and the other terminal of the capacitor C1 is connected to each of a low potential input terminal i− of the conversion circuit 112 and a low potential output terminal o− of the conversion circuit 112.

For example, the inductor L1 may be an inductor that includes a coil and a magnetic core and that has a strong energy storage capability. The magnetic core of the inductor L1 may be of a type such as ferrite or iron powder, and the coil may be of a type such as a biased line or a Leeds line.

In each period, the conversion circuit 112 shown in FIG. 8 mainly has two work states:

State 1: The switching transistor Q7 is turned on and the switching transistor Q8 is turned off.

In this case, a current is input through the high potential input terminal i+ of the conversion circuit 112, transmitted through the inductor L1 and the switching transistor Q7, and then output through the high potential output terminal o+ of the conversion circuit 112. A current flowing back is input through the low potential output terminal o− of the conversion circuit 112, and flows back to the low potential input terminal i− of the conversion circuit 112, to form a charge circuit of the inductor L1. In this case, the inductor L1 is charged, and an output voltage Vout is a difference obtained by subtracting a voltage of the inductor L1 from the input voltage Vin. In other words, in this case, the voltage VL1 of the inductor L1 satisfies Formula 5:

$$VL1 = Vin - Vout \qquad \text{(Formula 5)}$$

The voltage of the inductor L1 is an electric potential difference obtained by subtracting an electric potential of the other terminal of the inductor L1 from an electric potential of one terminal, of the inductor L1, connected to the high potential input terminal i+. Details are not described in a subsequent embodiment.

State 2: The switching transistor Q7 is turned off and the switching transistor Q8 is turned on.

In this case, a current is input through the high potential input terminal i+ of the conversion circuit 112 and transmitted through the inductor L1, the switching transistor Q8, and the capacitor C3, and then flows back to the low potential input terminal i− of the conversion circuit 112, to form a discharge circuit of the inductor L1. In this case, the inductor L1 is discharged, and a voltage of the capacitor C3 is a difference obtained by subtracting the voltage of the inductor L1 from the input voltage Vin. That is, VC3=Vin−VL1. In addition, because the transformation ratio of the switched capacitor unit is 2, that is, Vout=2VC3, Formula 6 may be obtained:

$$VL1 = Vin - Vout/2 \qquad \text{(Formula 6)}$$

It is assumed that a duty cycle of the switching transistor Q7 is D, which represents a proportion of a cut-off time period of the switching transistor Q7 in each period. Then, it may be learned, based on a voltage-second balance rule, that (Vin−Vout)D+(Vin−Vout/2)(1−D)=0, and the formula 7 may be obtained as follows:

$$Vout = \frac{2Vin}{1 + D} \qquad \text{(Formula 7)}$$

In Formula 7, the duty cycle D of the switching transistor Q7 may be any value in [0, 1]. The duty cycle D of the switching transistor Q7 is adjusted, so that the output voltage Vout may continuously change between Vin and 2Vin. When a value of D is 0, that is, the switching transistor Q7 is kept turned off in the period, and the switching transistor Q8 is kept turned on in the period, the output voltage Vout may reach 2Vin. When a value of D is 1, that is, the switching transistor Q7 is kept turned on in the period, and the switching transistor Q8 is kept turned off in the period, the output voltage Vout may reach Vin.

However, the output voltage Vout of the conversion circuit 112 shown in FIG. 8 is still limited, and a maximum value of the output voltage Vout can only reach 2Vout, that is, a maximum transformation ratio of the conversion circuit 112 can only reach the transformation ratio of the switched capacitor unit. In view of this, an embodiment provides a conversion circuit. The conversion circuit may be used as the conversion circuit 112 shown in FIG. 1. A maximum transformation ratio of the conversion circuit is not limited by the transformation ratio of the switched capacitor unit, and supports continuous adjustment of the transformation ratio of the conversion circuit.

Figure 9:
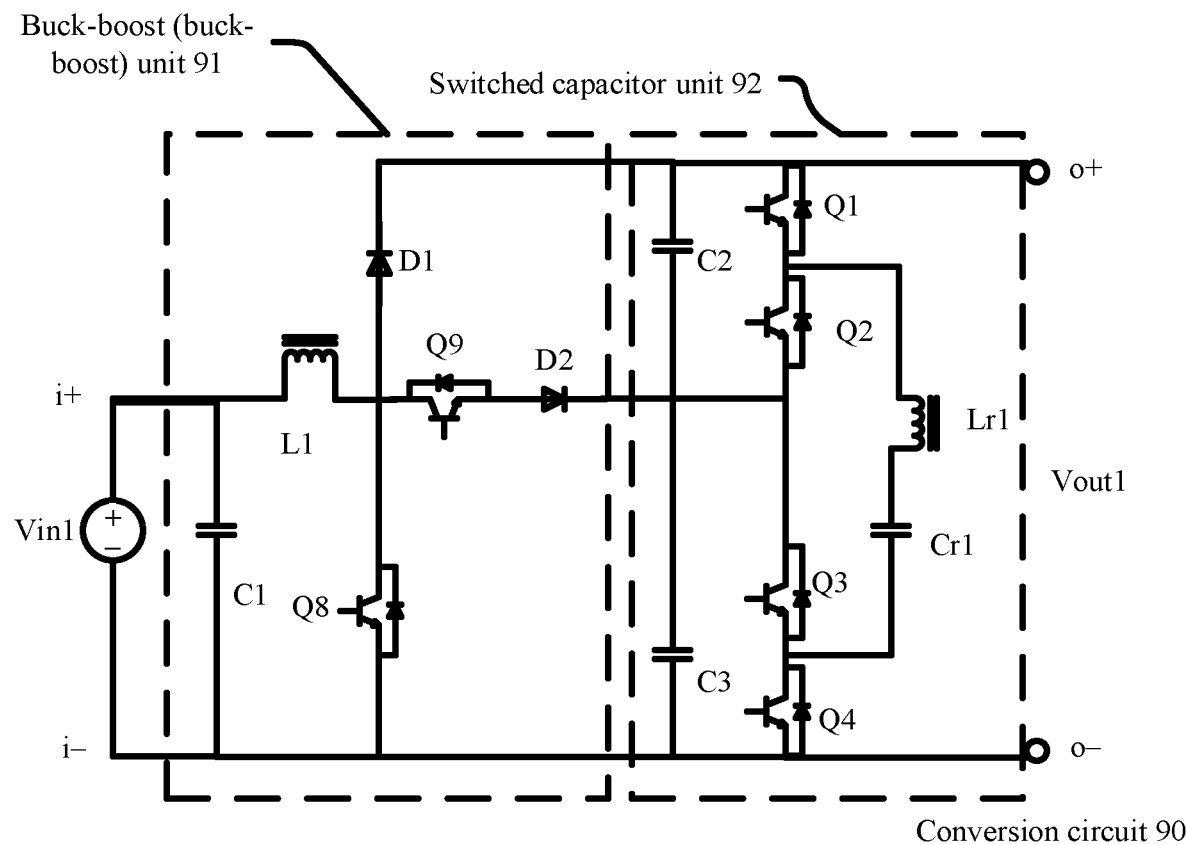
FIG. 9 is a schematic diagram of a structure of a conversion circuit according to an embodiment.

For example, as shown in FIG. 9, a conversion circuit 90 provided in this embodiment mainly includes a buck-boost unit 91, or buck-booster 91, and a switched capacitor unit 92, or switched capacitor circuit 92. Both a high potential terminal of the buck-boost unit 91 and a high potential terminal of the switched capacitor unit 92 are connected to a high potential output terminal o+ of the conversion circuit 90. A first intermediate terminal of the buck-boost unit 91 is connected to a second intermediate terminal of the switched capacitor unit 92. Both a low potential terminal of the buck-boost unit 91 and a low potential terminal of the switched capacitor unit 92 are connected to a low potential output terminal o− of the conversion circuit 90.

The buck-boost unit 91 may receive a first input voltage Vin1, perform buck conversion or boost conversion on the first input voltage Vin1 to obtain a forward voltage, and provide the forward voltage for the switched capacitor unit. Specifically, the buck-boost unit 91 may perform buck conversion on the first input voltage Vin1. In this case, the forward voltage is not less than 1/N of the first input voltage Vin1, and is not greater than the first input voltage Vin1. N is a transformation ratio of the switched capacitor unit 92, and N is an integer greater than or equal to 1. The buck-boost unit 91 may further perform boost conversion on the first input voltage Vin1. In this case, the forward voltage is not less than the first input voltage Vin1. The switched capacitor unit 92 may perform boost conversion on the forward voltage, and output a forward voltage obtained after the boost conversion as a first output voltage Vout1. If the forward voltage is V1, the first output voltage is Vout1=NV1.

Because the buck-boost unit 91 in this embodiment may perform buck conversion on the first input voltage, when the buck-boost unit 91 performs buck conversion on the first input voltage, it may be learned, based on Formula 7, that the first output voltage Vout1 may reach any voltage between Vin1 and 2Vin1. In addition, because the buck-boost unit 91 may further perform boost conversion on the first input voltage, when the buck-boost unit 91 performs boost conversion on the first input voltage, the forward voltage may reach a value not less than Vin. After the switched capacitor unit 32 performs boost conversion on the forward voltage, the first output voltage Vout1 may reach a value not less than 2Vin1.

Therefore, the conversion circuit 90 provided in this embodiment may support continuous adjustment of the transformation ratio, and a maximum transformation ratio of the conversion circuit 90 is no longer limited by a transformation ratio of the switched capacitor unit 92. Therefore, the conversion circuit 90 provided in this embodiment has higher universality.

It may be understood that a specific implementation of the switched capacitor unit 92 is not limited in this embodiment. The second intermediate terminal and the low potential terminal of the switched capacitor unit 92 may be understood as two terminals of the switched capacitor unit 92 for receiving the forward voltage. For example, a circuit topology structure of the switched capacitor unit 92 may be a switched capacitor circuit topology structure shown in FIG. 2 and FIG. 6. In the conversion circuit 90 shown in FIG. 9, the second intermediate terminal of the switched capacitor unit 92 may be understood as any connection point in an electrical connection between a capacitor C2 and a capacitor C3.

The following further provides example descriptions of the buck-boost unit 91 in this embodiment by using the following embodiments.

Embodiment 1

As shown in FIG. 9, the buck-boost unit 91 includes an inductor L1, a diode D1, a diode D2, a switching transistor Q8, and a switching transistor Q9. One terminal of the inductor L1 is connected to a high potential input terminal i+ of the conversion circuit 90, and the other terminal of the inductor L1 is connected to each of an anode of the diode D1, a first electrode of the switching transistor Q9, and a first electrode of the switching transistor Q8. A cathode of the diode D1 is connected to a high potential output terminal o+ of the conversion circuit 90, and a second electrode of the switching transistor Q8 is connected to each of a low potential input terminal i− and a low potential output terminal o− of the conversion circuit 90. A second electrode of the switching transistor Q9 is connected to an anode of the diode D2. A cathode of the diode D2 may be used as a first intermediate terminal of the buck-boost unit 91, and is connected to a second intermediate terminal of the switched capacitor unit 92.

In FIG. 9, the buck-boost unit 91 may not only perform buck conversion on a first input voltage V1, but also perform boost conversion on the first input voltage V1. Details are as follows:

1. When the buck-boost unit 91 performs buck conversion on the first input voltage Vin1, a first output voltage Vout1 of the conversion circuit 90 may be any value between Vin1 and 2Vin1.

Figure 10:
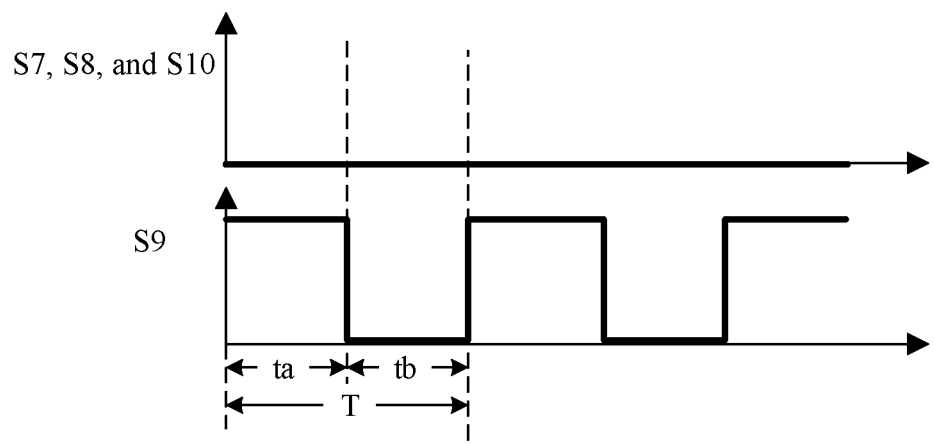
FIG. 10 is a schematic diagram of a control signal according to an embodiment.

Based on the conversion circuit 90 shown in FIG. 9, if both the switching transistor Q8 and the switching transistor Q9 are turned on at a high electrical level and turned off at a low electrical level, the buck-boost unit 91 may perform buck conversion on the first input voltage Vin1 based on a control signal shown in FIG. 10. A control signal S8 is used to control turn-on and turn-off of the switching transistor Q8, and a control signal S9 is used to control turn-on and turn-off of the switching transistor Q9.

As shown in FIG. 10, the control signal S8 is at a low electrical level in the period T, so that the switching transistor Q8 is kept turned off in the period T. In a time period to of the period T, the control signal S9 is at a high electrical level, so that the switching transistor Q9 is kept turned on in the time period ta. In a time period tb of the period T, the control signal S9 is at a low electrical level, so that the switching transistor Q9 is kept turned off in the time period tb. The following separately describes equivalent circuits of the buck-boost unit 91 in the time period ta and the time period tb by using a scenario in which a transformation ratio of the switched capacitor unit 92 is 2 as an example. It should be noted that, a work state of the buck-boost unit 91 is not necessarily related to a work state of the switched capacitor unit 92. Therefore, the work state of the switched capacitor unit 92 is not limited in the following embodiments.

Figure 11A:
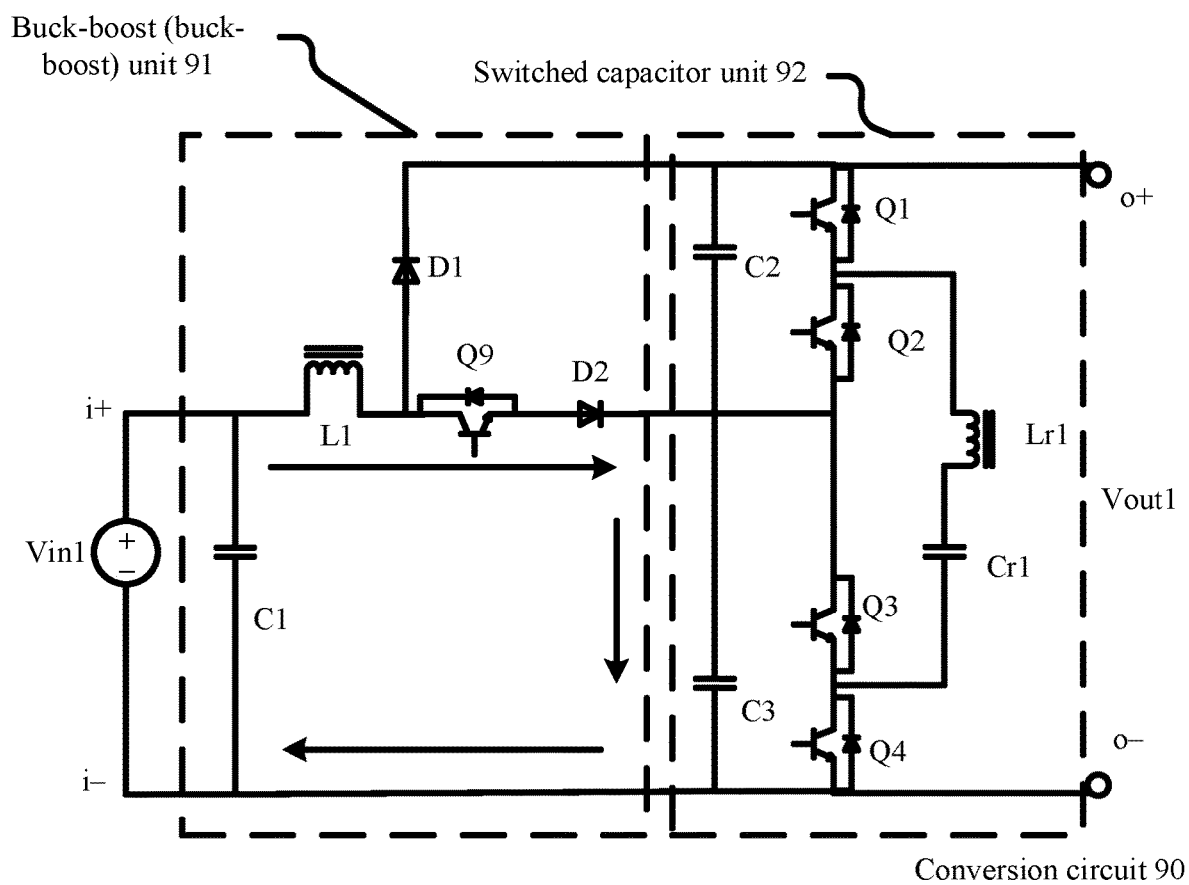
FIG. 11A and FIG. 11B are schematic diagrams of structures of equivalent circuits of a conversion circuit according to an embodiment.

Time Period Ta:

As shown in FIG. 10, in the time period ta, the control signal S8 is at a low electrical level, so that the switching transistor Q8 is turned off. The control signal S9 is at a high electrical level, so that the switching transistor Q9 is turned on. In this case, an equivalent circuit of the conversion circuit 90 may be shown in FIG. 11A. A current is input through the high potential input terminal i+ of the conversion circuit 90 and transmitted through the inductor L1, the switching transistor Q9, the diode D2, and a capacitor C3, and then flows back to the low potential input terminal i– of the conversion circuit 90, to form a charge circuit of the inductor L1.

In this case, a forward voltage provided by the buck-boost unit 91 for the switched capacitor unit 92 is a voltage of the capacitor C3. It can be learned from FIG. 11A that, in this case, the forward voltage is a difference obtained by subtracting a voltage of the inductor L1 from the first input voltage Vin1, that is, VC3=Vin1−VL1. Because the first output voltage Vout1=2VC3, it may be learned that VL1=Vin1−Vout1/2.

Figure 11B:
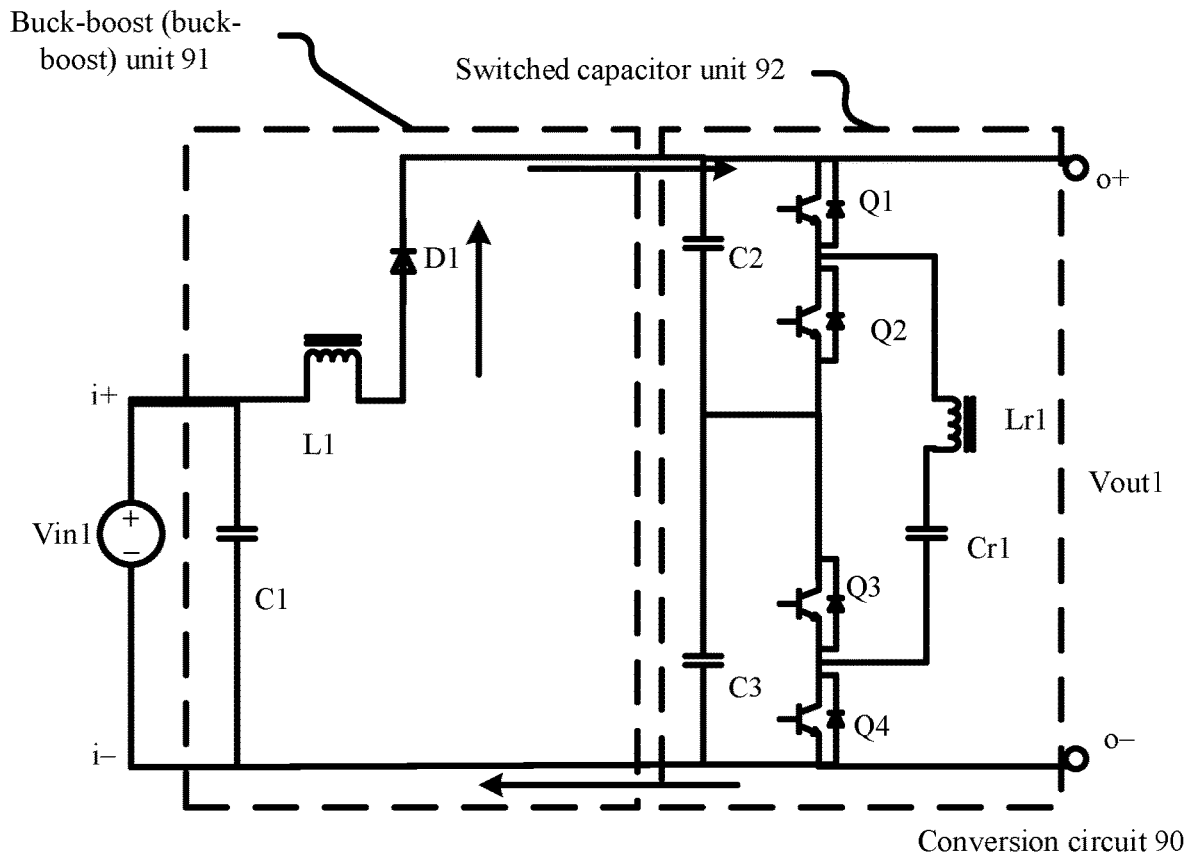

Time Period Tb:

As shown in FIG. 10, in the time period tb, the control signal S8 is at a low electrical level, so that the switching transistor Q8 is turned off. The control signal S9 is at a low electrical level, so that the switching transistor Q9 is turned off. In this case, an equivalent circuit of the conversion circuit 90 may be shown in FIG. 11B. A current is input through the high potential input terminal i+ of the conversion circuit 90, transmitted through the inductor L1 and the diode D1, and then output through the high potential output terminal o+ of the conversion circuit 90. A current flowing back is input through the low potential output terminal o− of the conversion circuit 90, and flows back to the low potential input terminal i− of the conversion circuit 90, to form a discharge circuit of the inductor L1. In this case, Vin1−VL1−Vout1=0, and it may be further learned that VL1=Vin1−Vout1.

Based on the voltage of the inductor L1 in each of the time period ta and the time period tb, it may be learned, based on a voltage-second balance rule, that (Vin1−Vout1/2)ta+(Vin1−Vout1)tb=0. If a duty cycle of the switching transistor Q9 is D1, that is, D1=ta/T=ta/(ta+tb), Formula 8 may be further obtained:

$$Vout1 = \frac{2Vin1}{2 - D1} \quad \text{(Formula 8)}$$

In Formula 8, the duty cycle D1 of the switching transistor Q9 may be any value in [0, 1]. The duty cycle D1 of the switching transistor Q9 is adjusted, so that the first output voltage Vout1 may continuously change between Vin1 and 2Vin1. When a value of D1 is 0, that is, the switching transistor Q9 is kept turned off in the period, the first output voltage Vout1 may reach Vin1. When the value of D1 is 1, that is, the switching transistor Q9 is kept turned on in the period, the first output voltage Vout1 may reach 2Vin1.

2. When the buck-boost unit 91 performs boost conversion on the first input voltage Vin1, the first output voltage Vout1 of the conversion circuit 90 may be any value not less than 2Vin1.

Figure 12:
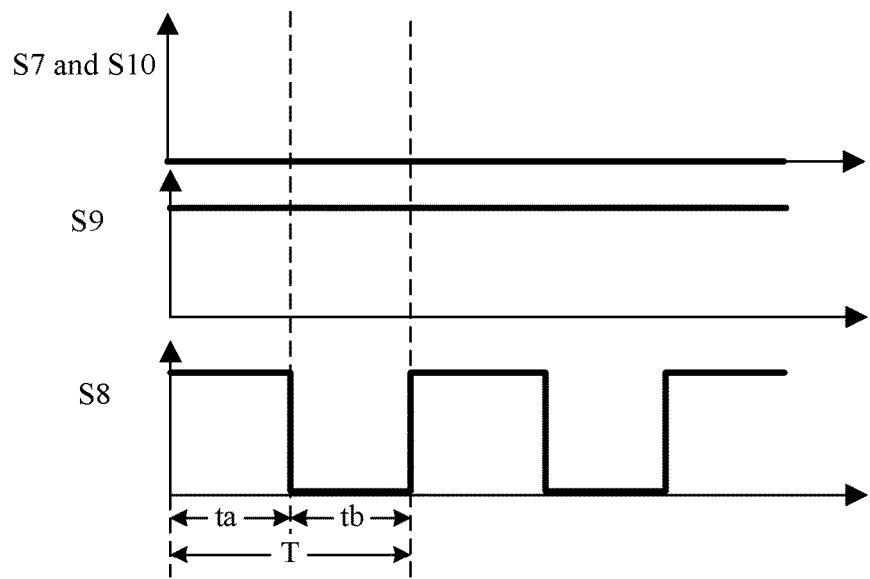
FIG. 12 is a schematic diagram of a control signal according to an embodiment.

Based on the conversion circuit 90 shown in FIG. 9, if both the switching transistor Q8 and the switching transistor Q9 are turned on at a high electrical level and turned off at a low electrical level, the buck-boost unit 91 may perform boost conversion on the first input voltage Vin1 based on a control signal shown in FIG. 12. The control signal S8 is used to control turn-on and turn-off of the switching transistor Q8, and the control signal S9 is used to control turn-on and turn-off of the switching transistor Q9.

As shown in FIG. 10, the control signal S9 is at a high electrical level in the period T, so that the switching transistor Q9 is kept turned on in the period T. In the time period ta of the period T, the control signal S8 is at a high electrical level, so that the switching transistor Q8 is kept turned on in the time period ta. In the time period tb of the period T, the control signal S8 is at a low electrical level, so that the switching transistor Q8 is kept turned off in the time period tb. The following separately describes equivalent circuits of the buck-boost unit 91 in the time period ta and the time period tb by using a scenario in which a transformation ratio of the switched capacitor unit 92 is 2 as an example. It should be noted that, a work state of the buck-boost unit 91 is not necessarily related to a work state of the switched capacitor unit 92. Therefore, the work state of the switched capacitor unit 92 is not limited in the following embodiments.

Figure 13A:
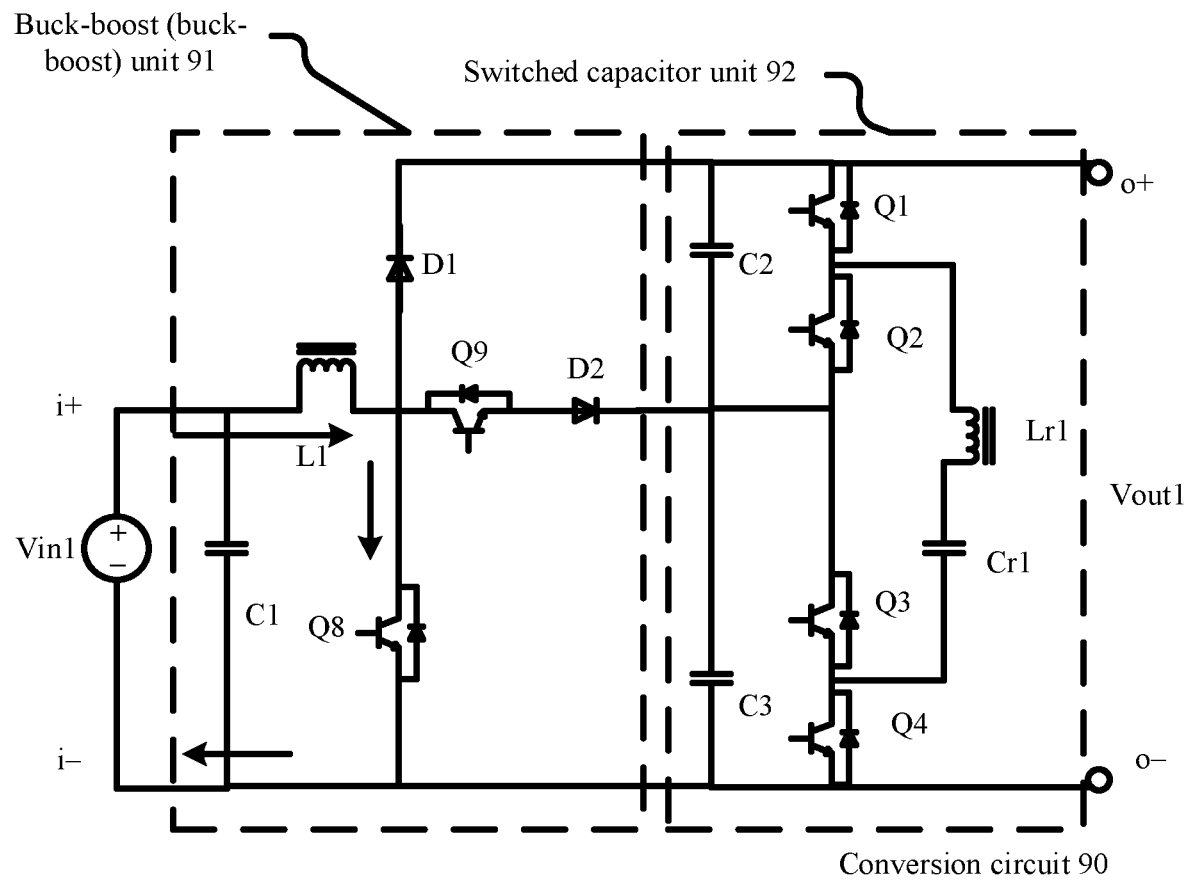
FIG. 13A and FIG. 13B are schematic diagrams of structures of equivalent circuits of a conversion circuit according to an embodiment.

Time Period Ta:

As shown in FIG. 12, in the time period ta, the control signal S9 is at a high electrical level, so that the switching transistor Q9 is turned on. The control signal S8 is at a high electrical level, so that the switching transistor Q8 is turned on. In this case, the equivalent circuit of the conversion circuit 90 may be shown in FIG. 13A. A current is input through the high potential input terminal i+ of the conversion circuit 90 and transmitted through the inductor L1 and the switching transistor Q8, and then flows back to the low potential input terminal i− of the conversion circuit 90, to form a charge circuit of the inductor L1. In this case, Vin1−VL1=0, and it may be further learned that VL1=Vin1.

Figure 13B:
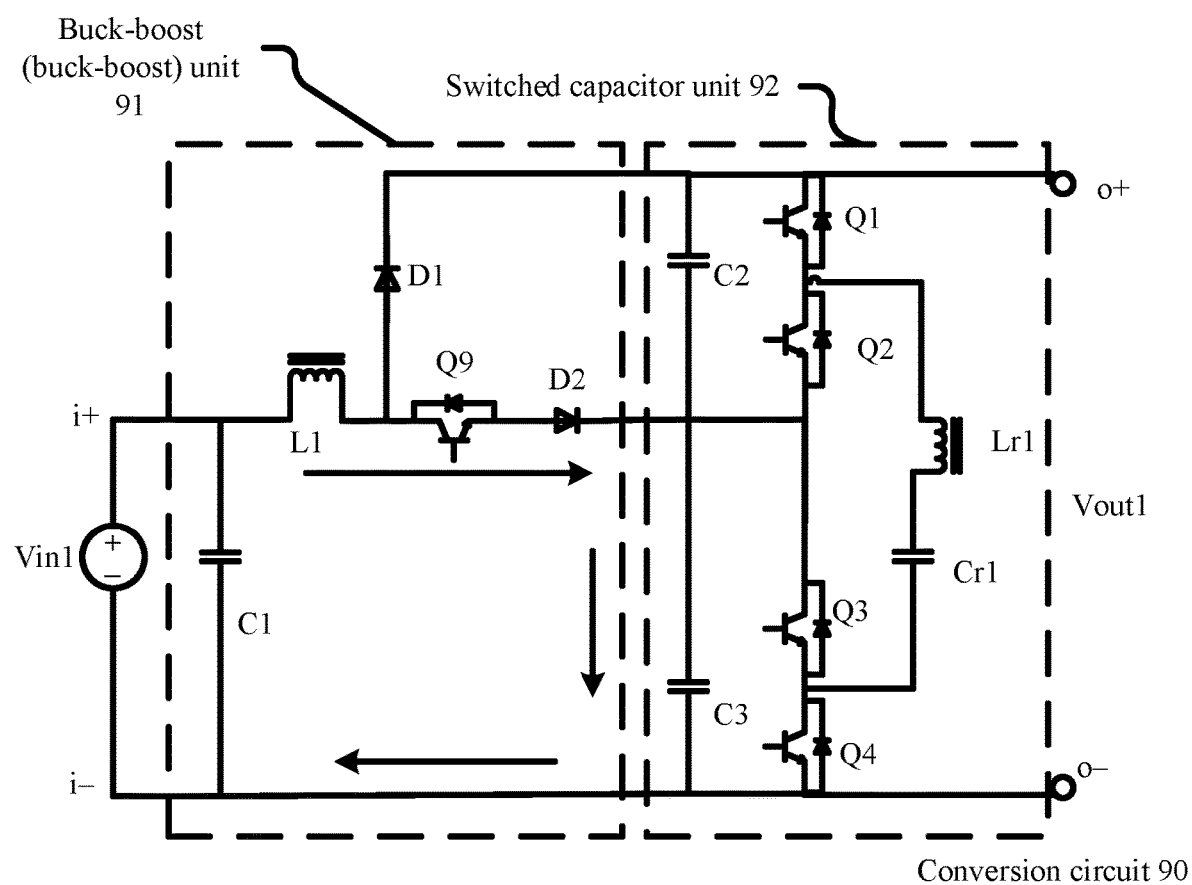

Time Period Tb:

As shown in FIG. 12, in the time period tb, the control signal S8 is at a low electrical level, so that the switching transistor Q8 is turned off. The control signal S9 is at a high electrical level, so that the switching transistor Q9 is turned on. In this case, the equivalent circuit of the conversion circuit 90 may be shown in FIG. 13B.

A current is input through the high potential input terminal i+ of the conversion circuit 90 and transmitted through the inductor L1, the switching transistor Q9, the diode D2, and the capacitor C3, and then flows back to the low potential input terminal i− of the conversion circuit 90, to form a discharge circuit of the inductor L1. In this case, Vin1−VL1−VC3=0, and a voltage VC3 of the capacitor C3 is the forward voltage provided by the buck-boost unit 91 for the switched capacitor unit 92. In addition, because Vout1=2VC3, it may be further learned that VL1=Vin1−Vout1/2.

Based on the voltage of the inductor L1 in each of the time period ta and the time period tb, it may be learned, based on a voltage-second balance rule, that (Vin1)ta+(Vin1−Vout1/2)tb. If a duty cycle of the switching transistor Q8 is D2, that is, D2=ta/T=ta/(ta+tb), Formula 9 may be further obtained:

$$Vout1 = \frac{2Vin1}{1 - D2} \quad \text{(Formula 9)}$$

In Formula 9, the duty cycle D2 of the switching transistor Q8 may be any value in [0, 1]. The duty cycle D2 of the switching transistor Q8 is adjusted, so that the first output voltage Vout1 may continuously change in a range of 2Vin and ∞. When a value of D2 is 0, that is, the switching transistor Q8 is kept turned off in the period, the first output voltage Vout1 may reach 2Vin1. When the value of D2 is 1, that is, the switching transistor Q8 is kept turned on in the period, the first output voltage Vout1 may reach infinity.

It is considered that the first output voltage may reach infinity without considering a limitation of an energy storage capacity of the inductor L1. In an actual application, an actual maximum value of the first output voltage Vout1 is also limited by factors such as the inductance of the inductor L1.

Embodiment 2

In a possible implementation, the conversion circuit 90 provided in this embodiment may further receive a second input voltage Vin2 through the high potential output terminal o+ and the low potential output terminal o−. The switched capacitor unit 92 may perform buck conversion on the second input voltage Vin2, to obtain a reverse voltage. If the transformation ratio of the switched capacitor unit 92 is N, the reverse voltage may be Vin2/N.

The switched capacitor unit 92 may transmit the reverse voltage to the buck-boost unit 91 through the second intermediate terminal and the low potential terminal. The buck-boost unit 91 performs buck-boost conversion on the reverse voltage, uses a reverse voltage obtained after the buck-boost conversion as a second output voltage Vout2, and outputs the second output voltage Vout2 through the high potential input terminal i+ and the low potential input terminal i− of the conversion circuit 90.

Figure 14:
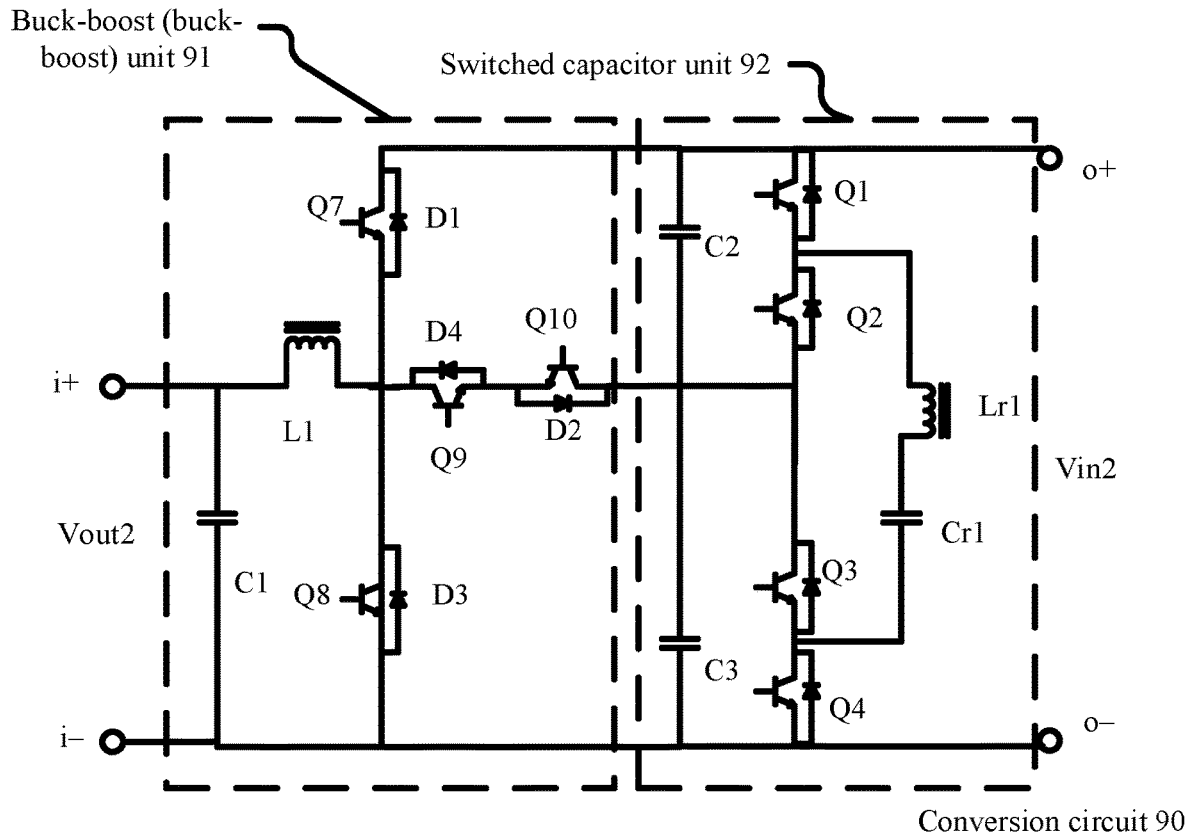
FIG. 14 is a schematic diagram of a structure of a conversion circuit according to an embodiment.

For example, as shown in FIG. 14, the buck-boost unit 91 may further include a switching transistor Q7 and a switching transistor Q10. The switching transistor Q7 includes the diode D1, and the switching transistor Q10 includes the diode D2. A first electrode of the switching transistor Q7 is connected to the high potential output terminal o+ of the conversion circuit 90, and a second electrode of the switching transistor Q7 is connected to the other terminal of the inductor L1. A first electrode of the switching transistor Q10 is used as the first intermediate terminal of the buck-boost unit 91, and is connected to the switched capacitor unit 92, and a second electrode of the switching transistor Q10 is connected to the second electrode of the switching transistor Q9.

In addition, the switching transistor Q8 includes a diode D3, an anode of the diode D3 is connected to the low potential input terminal i− of the conversion circuit, and a cathode of the diode D3 is connected to the other terminal, close to the switching transistor Q9, of the inductor L1. The switching transistor Q9 includes a diode D4, an anode of the diode D4 is connected to the switching transistor Q10, and a cathode of the diode D4 is connected to the inductor L1.

It can be understood that, to prevent the switching transistor Q7 and the switching transistor Q10 from affecting converting the first input voltage Vin1 to the first output voltage Vout1, the switching transistor Q7 and the switching transistor Q10 may be kept turned off in a process of converting the first input voltage Vin1 to the first output voltage Vout1.

For example, as shown in FIG. 10, a control signal S7 is a control signal for controlling the switching transistor Q7, and a control signal S10 is a control signal for controlling the switching transistor Q10. It can be learned from FIG. 10 that, when the buck-boost unit performs buck conversion on the first input voltage Vin1, both the control signals S7 and S10 are at a low electrical level, and the switching transistors Q7 and Q10 are kept turned off. For another example, as shown in FIG. 12, when the buck-boost unit performs boost conversion on the first input voltage Vin1, both the control signals S7 and S10 are at a low electrical level, and the switching transistors Q7 and Q10 are kept turned off.

The conversion circuit 90 shown in FIG. 14 may perform buck conversion on the second input voltage Vin2. The buck-boost unit 91 may not only perform buck conversion on the reverse voltage, but also perform boost conversion on the reverse voltage. The following functions are supported:

1. When the buck-boost unit 91 performs buck conversion on the reverse voltage, the second output voltage Vout2 of the conversion circuit 90 may be any value between 0 and Vin2/2.

Figure 15:
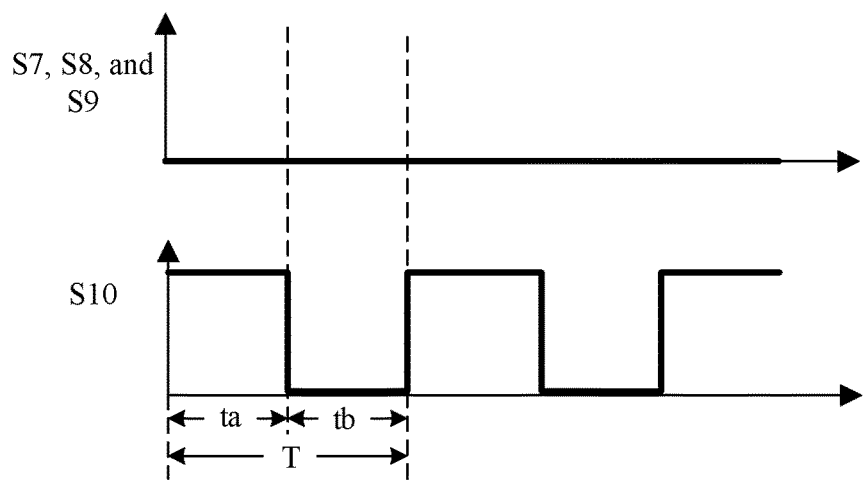
FIG. 15 is a schematic diagram of a control signal according to an embodiment.

Based on the conversion circuit 90 shown in FIG. 14, if the switching transistors Q7 to Q10 are all turned on at a high electrical level and turned off at a low electrical level, the buck-boost unit 91 may perform buck conversion on the reverse voltage based on a control signal shown in FIG. 15.

As shown in FIG. 15, the control signals S7, S8, and S9 are at a low electrical level in the period T, so that the switching transistors Q7 to Q9 are kept turned off in the period T. In the time period ta of the period T, the control signal S10 is at a high electrical level, so that the switching transistor Q10 is kept turned on in the time period ta. In the time period tb of the period T, the control signal S10 is at a low electrical level, so that the switching transistor Q10 is kept turned off in the time period tb.

The following separately describes equivalent circuits of the buck-boost unit 91 in the time period ta and the time period tb by using a scenario in which a transformation ratio of the switched capacitor unit 92 is 2 as an example. It should be noted that, a work state of the buck-boost unit 91 is not necessarily related to a work state of the switched capacitor unit 92. Therefore, the work state of the switched capacitor unit 92 is not limited in the following embodiments.

Figure 16A:
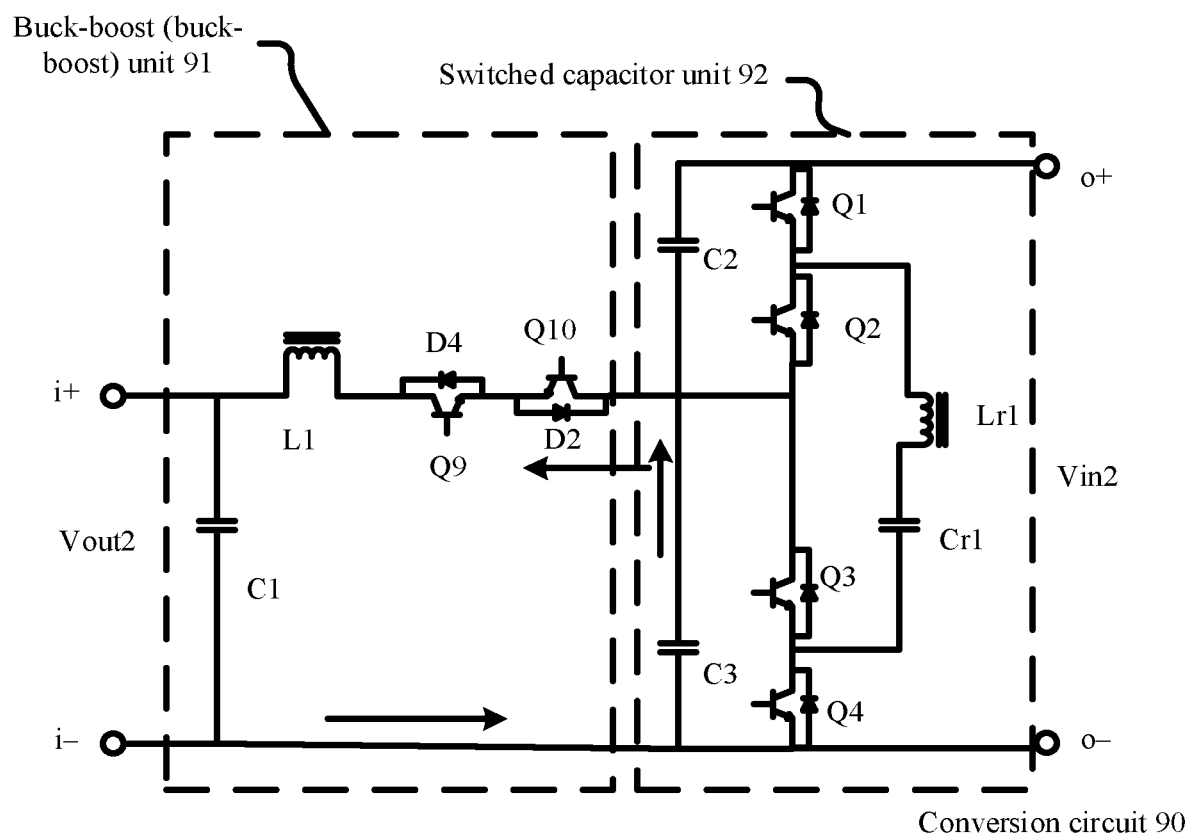
FIG. 16A and FIG. 16B are schematic diagrams of structures of equivalent circuits of a conversion circuit according to an embodiment.

Time Period Ta:

As shown in FIG. 15, in the time period ta, the switching transistors Q7, Q8, and Q9 are turned off, and the switching transistor Q10 is turned on. In this case, an equivalent circuit of the conversion circuit 90 may be shown in FIG. 16A.

A current is output through one terminal, close to the switching transistor Q10, of the capacitor C3, transmitted through the switching transistor Q10, the diode D4 in the switching transistor Q9, and the inductor L1, and then output through the high potential input terminal i+ of the conversion circuit 90. A current flowing back is input through the low potential input terminal i− of the conversion circuit 90, and flows back to one terminal, close to the low potential input terminal i− of the conversion circuit 90, of the capacitor C3, to form a charge circuit of the inductor L1.

In this case, the reverse voltage provided by the switched capacitor unit 92 for the buck-boost unit 91 is a voltage of the capacitor C3. It can be learned from FIG. 16A that, in this case, VC3+VL1−Vout2=0, that is, VL1=Vout2−VC3=Vout2−Vin2/2.

Figure 16B:
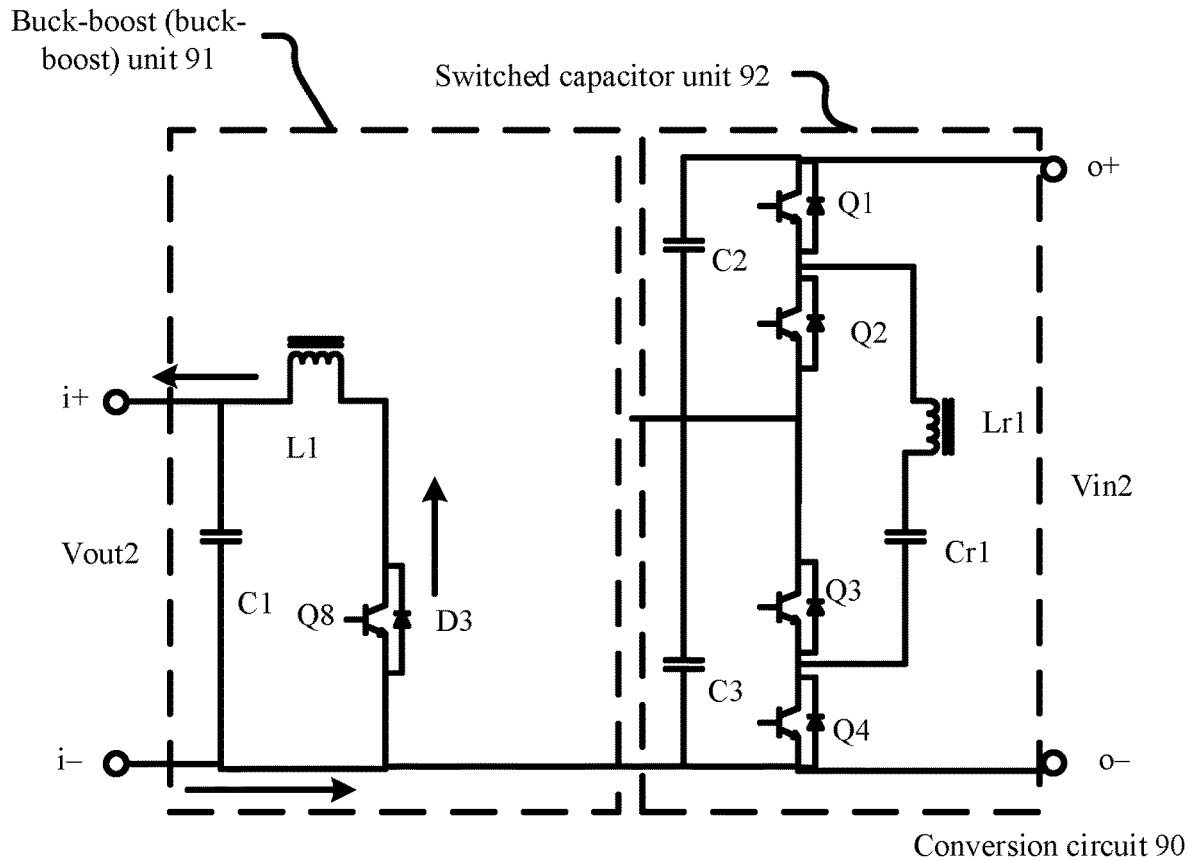

Time Period Tb:

As shown in FIG. 15, in the time period tb, the control signals S7 to S10 are all at a low electrical level, so that the switching transistors Q7 to Q10 are all turned off. In this case, an equivalent circuit of the conversion circuit 90 may be shown in FIG. 16B. A current is output through the high potential input terminal i+ of the conversion circuit 90, and a current flowing back is input through the low potential input terminal i− of the conversion circuit 90, and flows back to one terminal, close to the switching transistor Q8, of the inductor L1 through the diode D3, to form a discharge circuit of the inductor L1. In this case, Vout2−VL1=0, that is, VL1=Vout2.

Based on the voltage of the inductor L1 in each of the time period ta and the time period tb, it may be learned, based on the voltage-second balance rule, that (Vout2−Vin2/2)ta+(Vout2)tb=0. If a duty cycle of the switching transistor Q10 is D3, that is, D3=ta/T=ta/(ta+tb), Formula 10 may be further obtained:

$$Vout2 = \frac{D3 \cdot Vin2}{2} \quad \text{(Formula 10)}$$

In Formula 10, the duty cycle D3 of the switching transistor Q10 may be any value in [0, 1]. The duty cycle D3 of the switching transistor Q10 is adjusted, so that the second output voltage Vout2 may continuously change between 0 and Vin2/2. When a value of D3 is 0, that is, the switching transistor Q10 is kept turned off in the period, the second output voltage Vout2 may reach 0. When the value of D3 is 1, that is, the switching transistor Q10 is kept turned on in the period, the second output voltage Vout2 may reach Vin2/2.

2. When the buck-boost unit 91 performs boost conversion on the reverse voltage, the second output voltage Vout2 of the conversion circuit 90 may be any value between Vin2/2 and Vin2.

Figure 17:
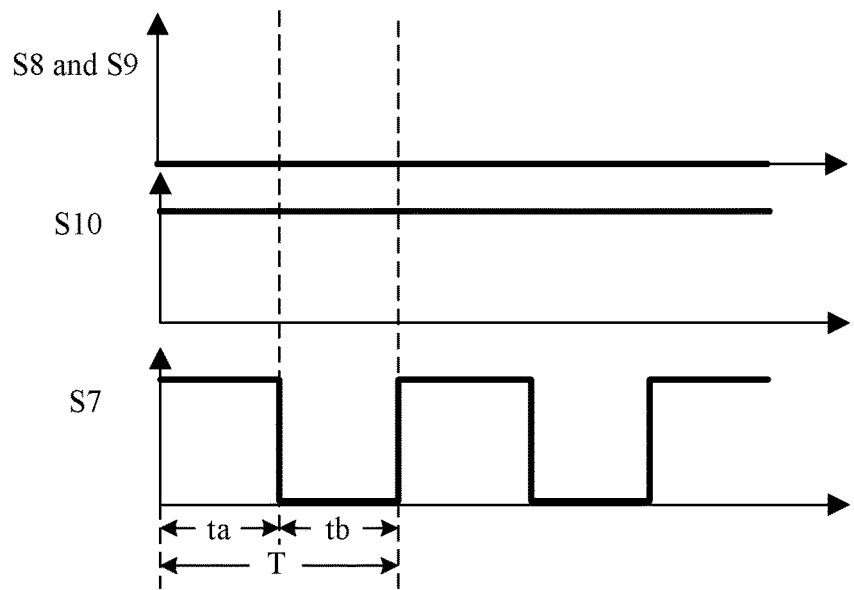
FIG. 17 is a schematic diagram of a control signal according to an embodiment.

Based on the conversion circuit 90 shown in FIG. 14, if the switching transistors Q7 to Q10 are all turned on at a high electrical level and turned off at a low electrical level, the buck-boost unit 91 may perform boost conversion on the reverse voltage based on a control signal shown in FIG. 17.

As shown in FIG. 17, the control signals S8 and S9 are at a low electrical level in the period T, so that the switching transistors Q8 and Q9 are kept turned off in the period T. The control signal S10 is at a high electrical level in the period T, so that the switching transistor Q10 is kept turned on in the period T. In the time period ta of the period T, the control signal S7 is at a high electrical level, so that the switching transistor Q7 is kept turned on in the time period ta. In the time period tb of the period T, the control signal S7 is at a low electrical level, so that the switching transistor Q7 is kept turned off in the time period tb.

The following separately describes equivalent circuits of the buck-boost unit 91 in the time period ta and the time period tb by using a scenario in which a transformation ratio of the switched capacitor unit 92 is 2 as an example. It should be noted that, a work state of the buck-boost unit 91 is not necessarily related to a work state of the switched capacitor unit 92. Therefore, the work state of the switched capacitor unit 92 is not limited in the following embodiments.

Figure 18A:
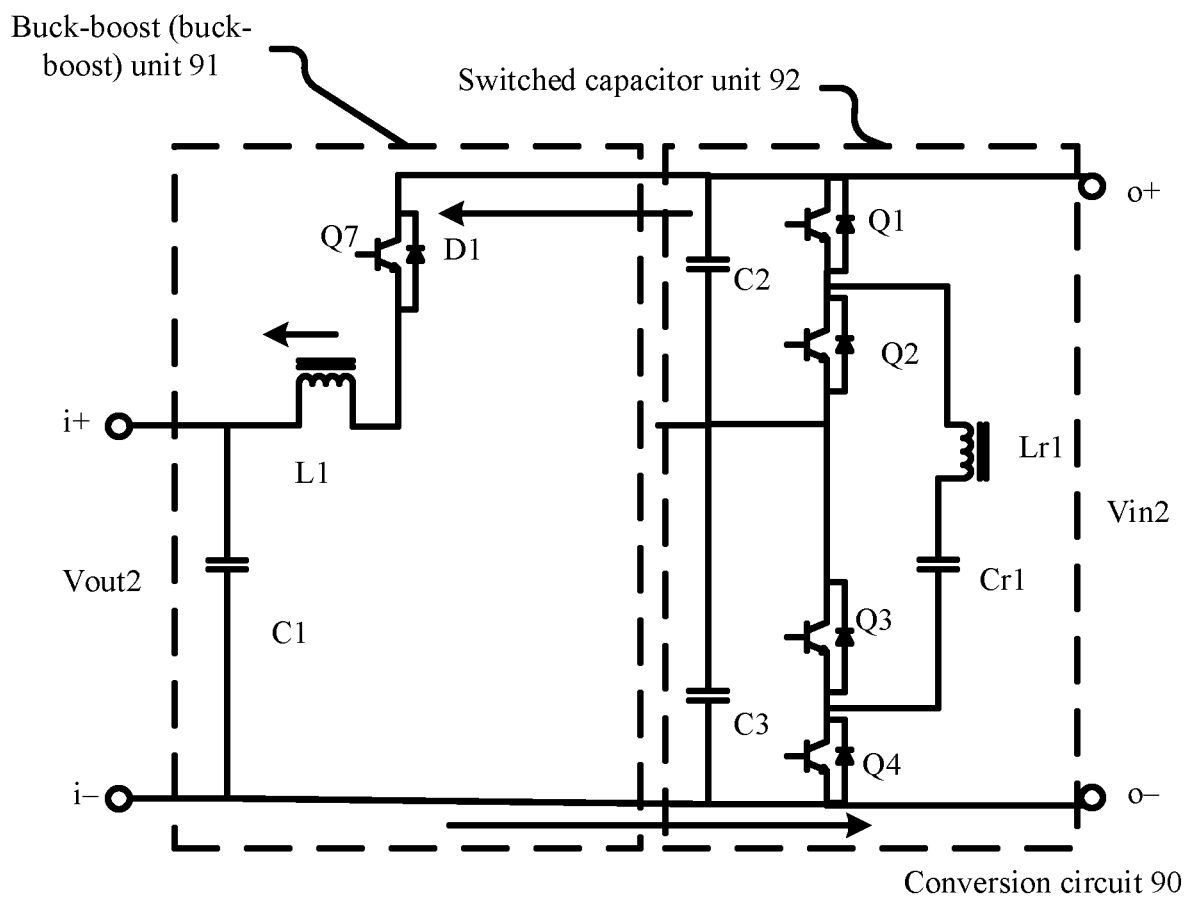
FIG. 18A and FIG. 18B are schematic diagrams of structures of equivalent circuits of a conversion circuit according to an embodiment.

Time Period Ta:

As shown in FIG. 17, in the time period ta, the switching transistors Q8 and Q9 are turned off, and the switching transistors Q7 and Q10 are turned on. In this case, an equivalent circuit of the conversion circuit 90 may be shown in FIG. 18A. A current is input through the high potential output terminal o+ of the conversion circuit 90, transmitted through the switching transistor Q7 and the inductor L1, and then output through the high potential input terminal i+ of the conversion circuit 90. A current flowing back is input through the low potential input terminal i− of the conversion circuit 90, and flows back to the low potential output terminal o− of the conversion circuit 90, to form a charge circuit of the inductor L1. In this case, Vin2+VL1−Vout2=0, that is, VL1=Vout2−Vin2.

Figure 18B:
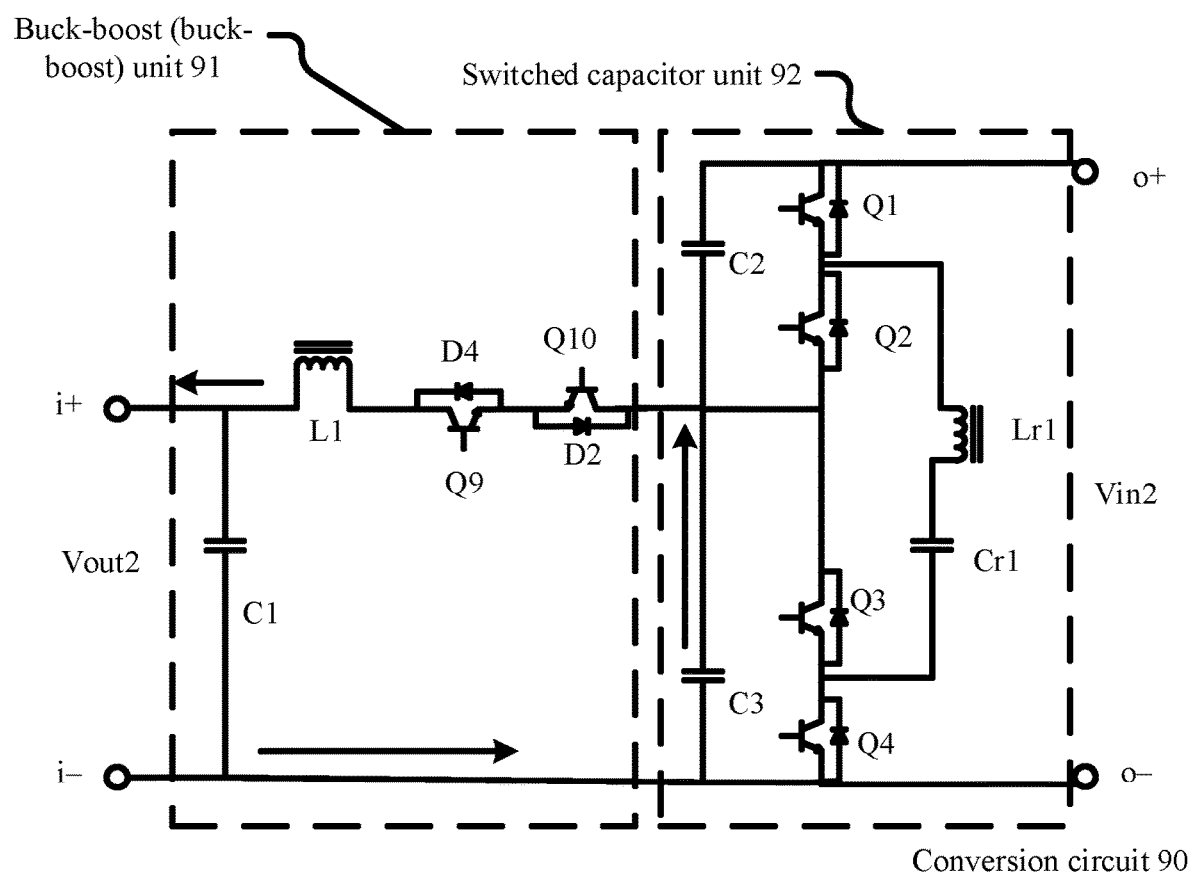

Time Period Tb:

As shown in FIG. 17, in the time period tb, the control signals S7 to S9 are all at a low electrical level, so that the switching transistors Q7 to Q9 are all turned off. The control signal S10 is at a high electrical level, so that the switching transistor Q10 is turned on. In this case, the equivalent circuit of the conversion circuit 90 may be shown in FIG. 18B. A current is output through one terminal, close to the switching transistor Q10, of the capacitor C3, transmitted through the inductor L1, and output through the high potential input terminal i+ of the conversion circuit 90. A current flowing back is input through the low potential input terminal i− of the conversion circuit 90, and flows back to one terminal, close to the low potential input terminal i− of the conversion circuit 90, of the capacitor C3, to form a discharge circuit of the inductor L1. In this case, Vout2−VL1−VC3=0. The voltage VC3 of the capacitor C3 is the reverse voltage provided by the switched capacitor unit 92 for the buck-boost unit 91, and it may be further learned that VL1=Vout2−VC3=Vout2−Vin2/2.

Based on the voltage of the inductor L1 in each of the time period to and the time period tb, it may be learned, based on the voltage-second balance rule, that (Vout2−Vin2)ta+(Vout2−Vin2/2)tb=0. If a duty cycle of the switching transistor Q7 is D4, that is, D4=ta/T=ta/(ta+tb), Formula 11 may be further obtained:

$$Vout2 = \frac{(D4+1) \cdot Vin2}{2} \quad \text{(Formula 11)}$$

In Formula 11, the duty cycle D4 of the switching transistor Q7 may be any value in [0, 1]. The duty cycle D4 of the switching transistor Q7 is adjusted, so that the second output voltage Vout2 may continuously change between Vin2/2 and Vin2. When a value of D4 is 0, that is, the switching transistor Q7 is kept turned off in the period, the second output voltage Vout2 may reach Vin2/2. When the value of D4 is 1, that is, the switching transistor Q7 is kept turned on in the period, the second output voltage Vout2 may reach Vin2.

It can be learned from Embodiment 1 that, the conversion circuit 90 provided in this embodiment may convert the first input voltage Vin1 to a value ranging from Vin1 to infinity. For example, the control circuit 114 may determine the duty cycle of the switching transistor Q8 or Q9 in a method shown in FIG. 19, so that the first output voltage Vin1 may reach a first target voltage that needs to be output by the conversion circuit 90. Specifically, the method mainly includes the following steps.

S1901: Power on a voltage conversion apparatus. For example, the voltage conversion apparatus may be the DC/DC booster 11 shown in FIG. 1. After the voltage conversion apparatus is powered on, the high potential input terminal i+ and the low potential input terminal i− of the conversion circuit 90 may receive the first input voltage Vin1.

S1902: The control circuit 114 controls the switching transistors Q1 to Q4 in the switched capacitor unit 92 to be turned on and turned off, so that the voltages of the capacitors C2 and C3 are balanced, that is, the voltages of the capacitors C2 and C3 are equal.

S1903: The control circuit 114 keeps the switching transistors Q7, Q8, and Q10 turned off, and adjusts a duty cycle D1 of the switching transistor Q9. For example, the control circuit 114 may adjust the duty cycle D1 of the switching transistor Q9 by gradually increasing the duty cycle D1 of the switching transistor Q9 from 0 to 1.

S1904: In a process of adjusting the duty cycle D1 within a range of [0, 1], if the first output voltage Vout1 reaches a first target voltage, the control circuit 114 continues to perform step S1905. In the process of adjusting the duty cycle D1 within the range of [0, 1], if the first output voltage Vout1 cannot reach the first target voltage, the control circuit 114 continues to perform step S1906.

S1905: The control circuit 114 keeps the current duty cycle D1 of the switching transistor Q9.

S1906: In the process of adjusting the duty cycle D1 within the range of [0, 1], if the first output voltage Vout1 cannot reach the first target voltage, it indicates that the first target output voltage may exceed 2Vin1. Therefore, the control circuit 114 may keep the switching transistors Q7 and Q10 turned off, keep the switching transistor Q9 turned on, and adjust a duty cycle D2 of the switching transistor Q8.

S1907: In a process of adjusting the duty cycle D2 within the range of [0, 1], if the first output voltage Vout1 reaches the first target voltage, the control circuit 114 continues to perform step S1908. In the process of adjusting the duty cycle D2 within the range of [0, 1], if the first output voltage Vout1 cannot reach the first target voltage, the control circuit 114 continues to perform step S1909.

S1908: The control circuit 114 keeps the current duty cycle D2 of the switching transistor Q8.

S1909: A state error occurs in the conversion circuit 90. The control circuit 114 may report the error. For example, if the first target voltage is less than Vin1, the conversion circuit 90 cannot output the first output voltage that reaches the first target voltage. In this case, a state error may occur.

Figure 19:
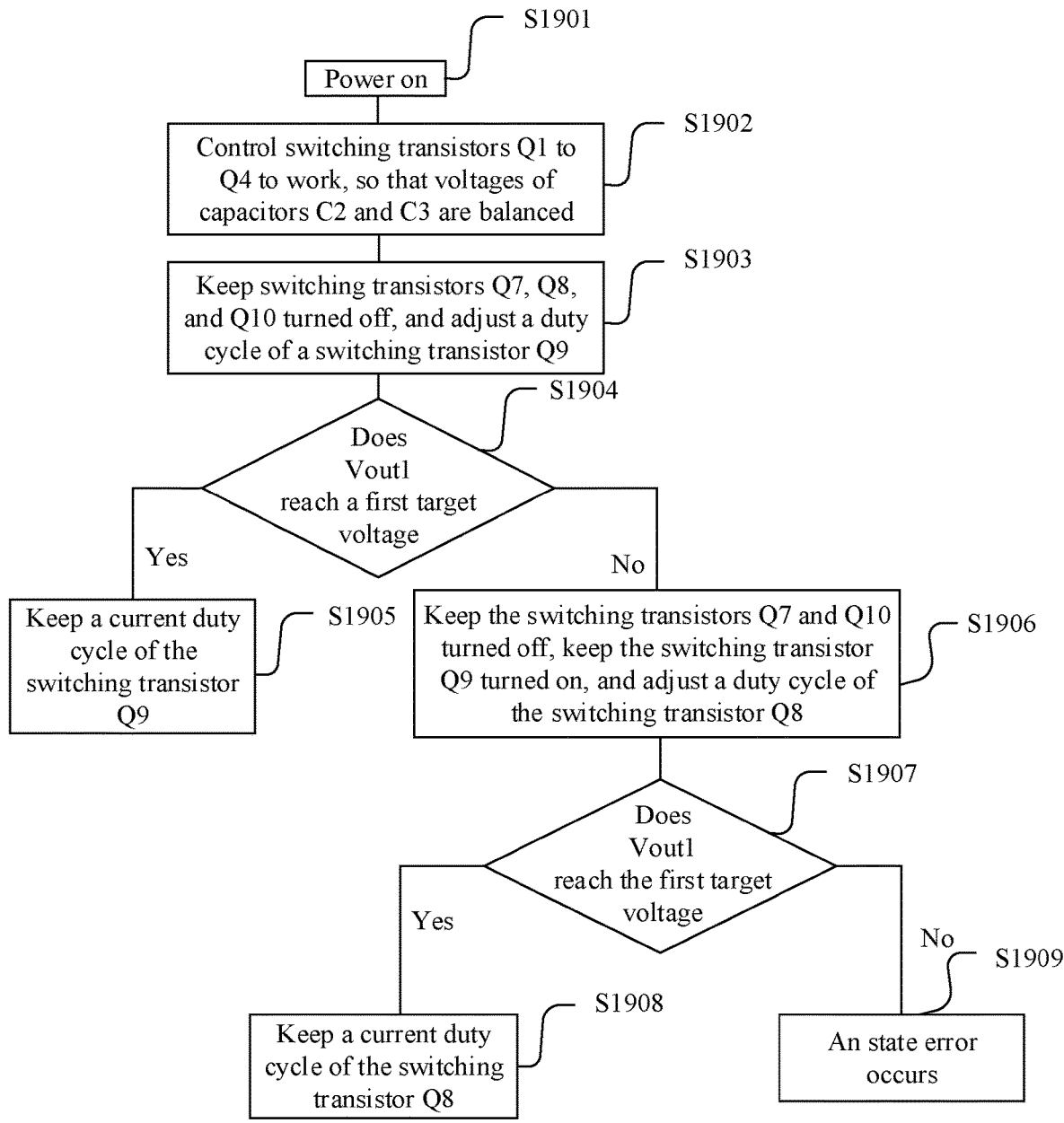
FIG. 19 is a schematic flowchart of a method for determining a duty cycle of a switching transistor according to an embodiment.

Similar to a case in FIG. 19, in this case, the control circuit 114 may also keep the switching transistors Q7 to Q9 turned off and adjust a duty cycle D3 of the switching transistor Q10. In this process, if the second output voltage Vin2 may reach a second target voltage, the control circuit 114 may keep the current duty cycle D3 of the switching transistor Q10. In the process of adjusting the duty cycle D3 within the range of [0, 1], if the second output voltage cannot reach the second target voltage, the control circuit 114 may keep the switching transistors Q8 and Q9 turned off, keep the switching transistor Q10 turned on, and adjust a duty cycle D4 of the switching transistor Q7. In this process, if the second output voltage Vin2 may reach the second target voltage, the control circuit 114 may keep the current duty cycle D4 of the switching transistor Q7. In the process of adjusting the duty cycle D4 within the range of [0, 1], if the second output voltage cannot reach the second target voltage, it indicates that a state error occurs in the conversion circuit 90. The control circuit 114 may report the error.

In conclusion, this embodiment provides the conversion circuit 90. The conversion circuit 90 includes the buck-boost unit 91 and the switched capacitor unit. The transformation ratio of the conversion circuit 90 is not limited by the switched capacitor unit. It should be noted that, the switched capacitor unit 92 in this embodiment has a boost function. Therefore, a requirement for a boost capability of the buck-boost unit 91 is lower, and the inductor L1 may be implemented by an inductor with smaller inductance. Usually, greater inductance of the inductor corresponds to a larger loss and size. Therefore, compared with a conventional boost circuit, the conversion circuit 90 provided in this embodiment helps to improve efficiency and reduce the size.

Figure 20:
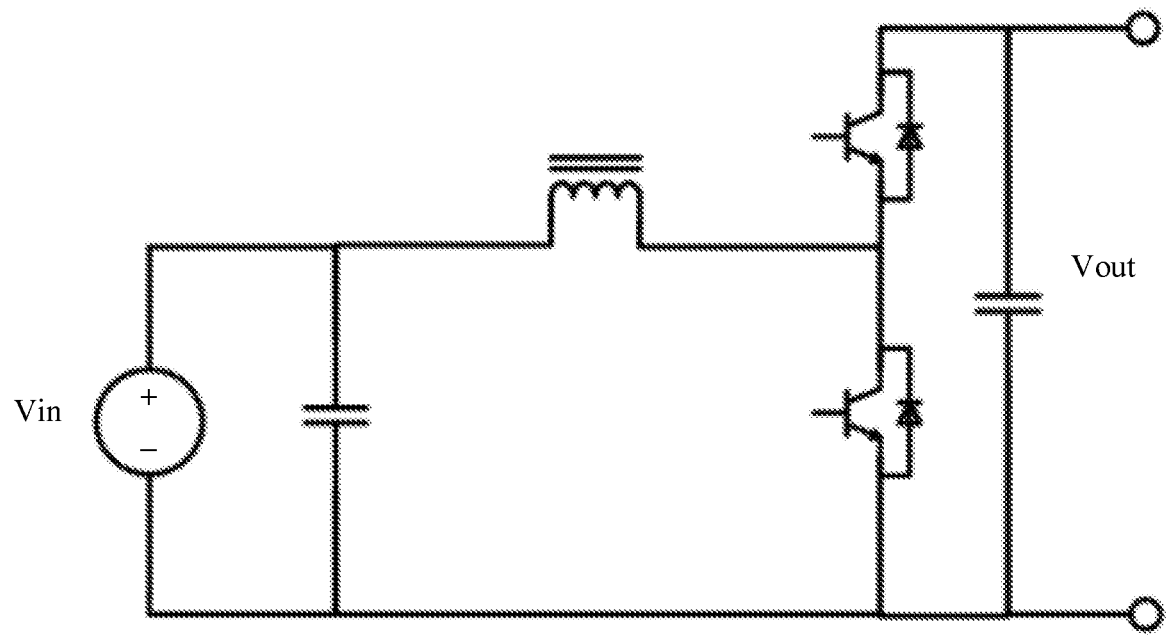
FIG. 20 is a schematic diagram of a structure of a conventional boost circuit.

A conventional boost circuit shown in FIG. 20 is used as an example. The conventional boost circuit mainly includes one inductor and two switching transistors. If the first input voltage Vin1 of the conversion circuit 90 and an input voltage of the conventional boost circuit each range from 300 V to 500 V; the first output voltage Vout1 of the conversion circuit 90 and an output voltage of the conventional boost circuit beach range from 600 V to 850 V; and a power of the conversion circuit 90 and a power of the conventional boost circuit each are 12.5 kW. Design parameters of the conversion circuit 90 and the conventional boost circuit are shown in Table 1:

TABLE 1

| Item | Conversion circuit 90 | Conventional boost circuit |
| --- | --- | --- |
| Switching tubes | IGBT 650 V/75 A | IGBT 1200 V/75 A |
| Inductance | 100 microhenrys (μH) | 500 μH |
| Switch frequency | 20 kHz | 15 kHz |

Specifically, an IGBT with a withstand voltage of 650 V and a maximum current of 75 A is used for each switching transistor in the conversion circuit 90, the inductance of the inductor L1 is 100 pH, and a switching frequency is 20 kHz. An IGBT with a withstand voltage of 1200 V and a maximum current of 75 A is used for each switching transistor in the conventional boost circuit, inductance of an inductor is 500 pH, and a switching frequency is 15 kHz.

Figure 21:
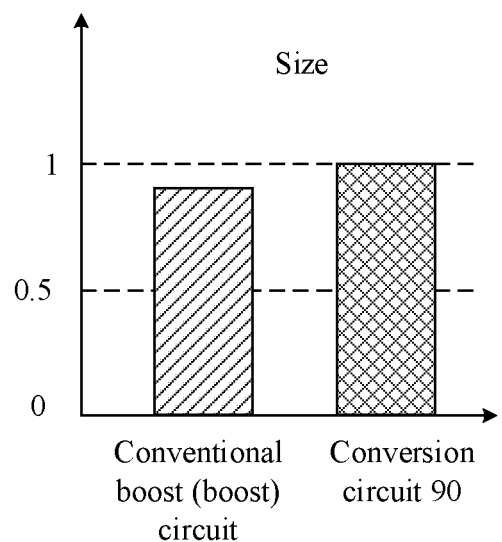
FIG. 21 is a first diagram of an effect comparison according to an embodiment.
Figure 22:
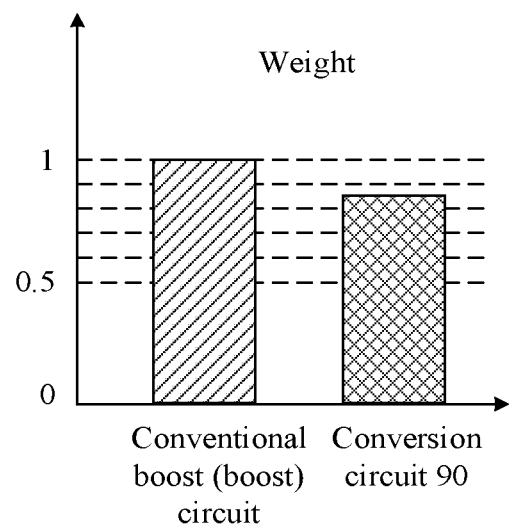
FIG. 22 is a second diagram of an effect comparison according to an embodiment.
Figure 23:
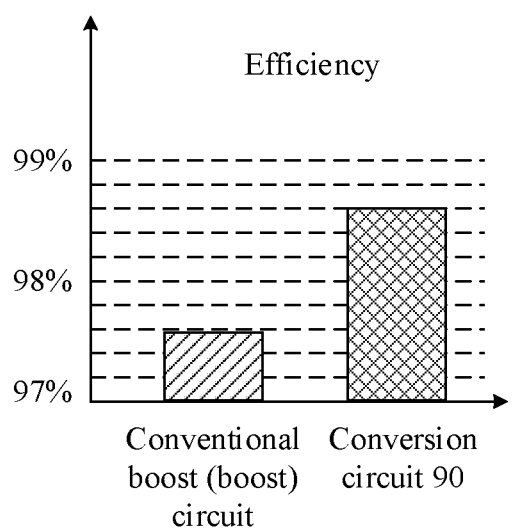
FIG. 23 is a third diagram of an effect comparison according to an embodiment.

After a comparison, it can be learned from FIG. 21 that, a size of the conventional boost circuit is close to a size of the conversion circuit 90 provided in this embodiment. However, it can be learned from FIG. 22 that, a weight of the conversion circuit 90 provided in this embodiment is much less than a weight of the conventional boost circuit. A reason is mainly that a smaller inductor may be used for the buck-boost unit 91 to reduce a weight of the inductor. In addition, it can be learned from FIG. 23 that, efficiency of the conventional boost circuit is approximately 97.5%, while efficiency of the conversion circuit 90 provided in this embodiment may be up to 98.5%, so that the efficiency of the conversion circuit 90 is significantly improved.

Based on a same technical concept, an embodiment further provides a voltage conversion apparatus, and the voltage conversion apparatus may include the conversion circuit 90 provided in any one of the foregoing embodiments. For example, the voltage conversion apparatus may be used as a DC/DC booster 11 in an electric vehicle 10. The conversion circuit 90 may be used as a conversion circuit 112 in the DC/DC booster 11, and a control circuit 114 is connected to a control electrode of each switching transistor in each of a buck-boost unit 91 and a switched capacitor unit 92, so that the conversion circuit 90 may be controlled to implement voltage conversion.

Based on a same technical concept, an embodiment further provides an electric vehicle, and the electric vehicle may be shown in FIG. 1. The electric vehicle 10 includes a DC/DC booster 11, and the DC/DC booster 11 is connected to a power battery, to charge a power battery 12. In the DC/DC booster 11, a conversion circuit 112 may be implemented by using the conversion circuit 90 provided in embodiments.

Certainly, a person skilled in the art can make various modifications and variations without departing from the protection scope of this disclosure. This disclosure is intended to cover these modifications and variations provided that they fall within the scope of protection defined by the following claims and their equivalent technologies.

What is claimed is:

1. A conversion circuit comprising:
    a high-potential output terminal;
    a low-potential output terminal configured to, with the high-potential output terminal, output a first output voltage;
    a buck-booster comprising a first high-potential terminal connected to the high-potential output terminal, a first intermediate terminal, and a first low-potential terminal connected to the low-potential output terminal, wherein the buck-booster is configured to:
        receive a first input voltage;
        perform buck-boost conversion on the first input voltage to obtain a forward voltage; and
        provide the forward voltage through the first intermediate terminal; and
    a switched capacitor circuit comprising a second high-potential terminal connected to the high-potential output terminal, a second intermediate terminal connected to the first intermediate terminal, and a second low-potential terminal connected to the low-potential output terminal, wherein the switched capacitor circuit is configured to:
        receive the forward voltage from the buck-booster and through the first intermediate terminal; and
        perform boost conversion on the forward voltage to obtain the first output voltage.

2. The conversion circuit of claim 1, further comprising a high-potential input terminal and a low-potential input terminal, wherein the buck-booster further comprises:
    a first diode comprising a first anode and a first cathode, wherein the first cathode is connected to the high-potential output terminal;
    a second diode comprising a second anode and a second cathode, wherein the second cathode is connected to the second intermediate terminal;
    a first switching transistor comprising a first electrode and a second electrode, wherein the second electrode is connected to the second anode;
    a second switching transistor comprising a third electrode and a fourth electrode, wherein the fourth electrode is connected to the low-potential output terminal and the low-potential input terminal; and
    an inductor comprising a first terminal connected to the high-potential input terminal and comprising a second terminal connected to the first anode, the first electrode, and the third electrode,
    wherein the high-potential input terminal and the low-potential input terminal are configured to receive the first input voltage.

3. The conversion circuit of claim 2, wherein the first output voltage is not less than the first input voltage, wherein the first output voltage is not greater than N times the first input voltage, wherein N is a transformation ratio of the switched capacitor circuit and is an integer greater than or equal to 1, wherein the first switching transistor is configured to be kept turned off during a first time period, wherein the first time period comprises a second time period and a third time period, and wherein the second switching transistor is configured to:
    be kept turned on during the second time period in order to charge the inductor; and
    be kept turned off during the third time period in order to discharge the inductor.

4. The conversion circuit of claim 2, wherein the first output voltage is not less than N times the first input voltage, wherein N is a transformation ratio of the switched capacitor circuit and is an integer greater than or equal to 1, wherein the second switching transistor is configured to be kept turned on during a first time period, wherein the first time period comprises a second time period and a third time period, and wherein the first switching transistor is configured to:
    be kept turned on during the second time period in order to charge the inductor; and
    be kept turned off during the third time period in order to discharge the inductor.

5. The conversion circuit of claim 2, wherein the high-potential output terminal and the low-potential output terminal are further configured to receive a second input voltage, wherein the high-potential input terminal and the low-potential input terminal are further configured to output a second output voltage, wherein the switched capacitor circuit is further configured to:
    perform buck conversion on the second input voltage to obtain a reverse voltage; and
    provide the reverse voltage to the buck-booster and through the second intermediate terminal, and
    wherein the buck-booster is further configured to:
        perform buck-boost conversion on the reverse voltage to obtain the second output voltage; and
        output the second output voltage through the high-potential input terminal and the low-potential input terminal.

6. The conversion circuit of claim 5, wherein the buck-booster further comprises:
    a third switching transistor comprising the first diode, a fifth electrode connected to the high-potential output terminal, and a sixth electrode connected to the second terminal; and
    a fourth switching transistor comprising the second diode, a seventh electrode connected to the sixth electrode, and an eighth electrode connected to the second intermediate terminal.

7. The conversion circuit of claim 6, wherein the first switching transistor further comprises a third diode, wherein the third diode comprises a third anode connected to the seventh electrode and comprises a third cathode connected to the second terminal, wherein the second switching transistor further comprises a fourth diode, and wherein the fourth diode comprises a fourth anode connected to the low-potential input terminal and the low-potential output terminal and comprises a fourth cathode connected to the second terminal.

8. The conversion circuit of claim 7, wherein the second output voltage is not less than 0, wherein the second output voltage is not greater than 1/N of the second input voltage, wherein N is a transformation ratio of the switched capacitor circuit and is an integer greater than or equal to 1, wherein the first switching transistor, the second switching transistor, and the third switching transistor are configured to be kept turned off during a first time period, wherein the first time period comprises a second time period and a third time period, and wherein the fourth switching transistor is configured to:
    be kept turned on during the second time period in order to charge the inductor; and
    be kept turned off during the third time period in order to discharge the inductor.

9. The conversion circuit of claim 7, wherein the second output voltage is not less than 1/N of the second input voltage, wherein the second output voltage is not greater than the second input voltage, wherein N is a transformation ratio of the switched capacitor circuit and is an integer greater than or equal to 1, wherein the first switching transistor and the second switching transistor are configured to be kept turned off during a first time period, wherein the first time period comprises a second time period and a third time period, wherein the fourth switching transistor is configured to be kept turned on during the first time period, and wherein the third switching transistor is configured to:
be kept turned on during the second time period in order to charge the inductor; and
be kept turned off during the third time period in order to discharge the inductor.

10. A voltage conversion apparatus comprising:
a conversion circuit comprising:
a high-potential output terminal;
a low-potential output terminal configured to, with the high-potential output terminal, output a first output voltage;
a buck-booster comprising a first high-potential terminal connected to the high-potential output terminal, a first intermediate terminal, and a first low-potential terminal connected to the low-potential output terminal; and
a switched capacitor circuit comprising a second high-potential terminal connected to the high-potential output terminal, a second intermediate terminal connected to the first intermediate terminal, a second low-potential terminal connected to the low-potential output terminal; and
a control circuit configured to:
control the buck-booster to perform buck-boost conversion on a first input voltage to obtain a forward voltage;
control the buck-booster to provide the forward voltage through the first intermediate terminal;
control the switched capacitor circuit to receive the forward voltage from the buck-booster and through the first intermediate terminal; and
control the switched capacitor circuit to perform boost conversion on the forward voltage to obtain the first output voltage.

11. The voltage conversion apparatus of claim 10, wherein the conversion circuit further comprises a high-potential input terminal and a low-potential input terminal, wherein the buck-booster further comprises:
a first diode comprising a first anode and a first cathode, wherein the first cathode is connected to the high-potential output terminal;
a second diode comprising a second anode and a second cathode, wherein the second cathode is connected to the second intermediate terminal;
a first switching transistor comprising a first electrode and a second electrode, wherein the second electrode is connected to the second anode;
a second switching transistor comprising a third electrode and a fourth electrode, wherein the fourth electrode is connected to the low-potential output terminal and the low-potential input terminal; and
an inductor comprising a first terminal connected to the high-potential input terminal and comprising a second terminal connected to the first anode, the first electrode, and the third electrode, and
wherein the high-potential input terminal and the low-potential input terminal are configured to receive the first input voltage.

12. The voltage conversion apparatus of claim 11, wherein the first output voltage is not less than N times the first input voltage, wherein N is a transformation ratio of the switched capacitor circuit and is an integer greater than or equal to 1, and wherein the control circuit is further configured to:
control the second switching transistor to be kept turned on during a first time period, wherein the first time period comprises a second time period and a third time period;
control the first switching transistor to be kept turned on during the second time period in order to charge the inductor; and
control the first switching transistor to be kept turned off during the third time period in order to discharge the inductor.

13. The voltage conversion apparatus of claim 12, wherein the control circuit is further configured to:
keep the second switching transistor turned on; and
adjust a duty cycle of the first switching transistor until the first output voltage reaches a target voltage, wherein the duty cycle is a ratio of the second time period to the first time period.

14. The voltage conversion apparatus of claim 11, wherein the high-potential output terminal and the low-potential output terminal are further configured to receive a second input voltage, wherein the high-potential input terminal and the low-potential input terminal are further configured to output a second output voltage, and wherein the control circuit is further configured to:
control the switched capacitor circuit to perform buck conversion on the second input voltage to obtain a reverse voltage;
control the switched capacitor circuit to provide the reverse voltage to the buck-booster and through the second intermediate terminal;
control the buck-booster to perform buck-boost conversion on the reverse voltage to obtain the second output voltage; and
control the buck-booster to output the second output voltage through the high-potential input terminal and the low-potential input terminal.

15. The voltage conversion apparatus of claim 14, wherein the buck-booster further comprises:
a third switching transistor comprising the first diode, a fifth electrode connected to the high-potential output terminal, and a sixth electrode connected to the second terminal; and
a fourth switching transistor comprising the second diode, a seventh electrode connected to the sixth electrode, and an eighth electrode connected to the second intermediate terminal.

16. The voltage conversion apparatus of claim 15, wherein the first switching transistor further comprises a third diode, wherein the third diode comprises a third anode connected to the seventh electrode and comprises a third cathode connected to the second terminal, wherein the second switching transistor further comprises a fourth diode, and wherein the fourth diode comprises a fourth anode connected to the low-potential input terminal and the low-potential output terminal and comprises a fourth cathode connected to the second terminal.

17. The voltage conversion apparatus of claim 16, wherein the second output voltage is not less than 0, wherein the second output voltage is not greater than 1/N of the second input voltage, wherein N is a transformation ratio of the switched capacitor circuit and is an integer greater than or equal to 1, and wherein the control circuit is further configured to:
- control the first switching transistor, the second switching transistor, and the third switching transistor to be kept turned off during a first time period, wherein the first time period comprises a second time period and a third time period;
- control the fourth switching transistor to be kept turned on during the second time period in order to charge the inductor; and
- control the fourth switching transistor to be kept turned off during the third time period in order to discharge the inductor.

18. The voltage conversion apparatus of claim 17, wherein the control circuit is further configured to:
- keep the first switching transistor, the second switching transistor, and the third switching transistor turned off during the first time period; and
- adjust a duty cycle of the fourth switching transistor until the second output voltage reaches a target voltage, wherein the duty cycle is a ratio of the second time period to the first time period.

19. The voltage conversion apparatus of claim 16, wherein the second output voltage is not less than 1/N of the second input voltage, wherein the second output voltage is not greater than the second input voltage, wherein N is a transformation ratio of the switched capacitor circuit and is an integer greater than or equal to 1, and wherein the control circuit is further configured to:
- control the first switching transistor and the second switching transistor to be kept turned off during a first time period, wherein the first time period comprises a second time period and a third time period;
- control the fourth switching transistor to be kept turned on during the first time period;
- control the third switching transistor to be kept turned on during the second time period in order to charge the inductor; and
- control the third switching transistor to be kept turned off during the third time period in order to discharge the inductor.

20. An electric vehicle comprising:
a power battery;
a voltage conversion apparatus configured to charge the power battery and comprising:
- a high-potential output terminal;
- a low-potential output terminal configured to, with the high-potential output terminal, output a first output voltage;
- a buck-booster comprising a first high-potential terminal connected to the high-potential output terminal, a first intermediate terminal, and a first low-potential terminal connected to the low-potential output terminal; and
- a switched capacitor circuit comprising a second high-potential terminal connected to the high-potential output terminal, a second intermediate terminal connected to the first intermediate terminal, a second low-potential terminal connected to the low-potential output terminal; and
- a control circuit configured to:
  - control the buck-booster to perform buck-boost conversion on a first input voltage to obtain a forward voltage;
  - control the buck-booster to provide the forward voltage through the first intermediate terminal;
  - control the switched capacitor circuit to receive the forward voltage from the buck-booster and through the first intermediate terminal; and
  - control the switched capacitor circuit to perform boost conversion on the forward voltage to obtain the first output voltage.

* * * * *